US011235731B2

(12) United States Patent
Morita et al.

(10) Patent No.: US 11,235,731 B2
(45) Date of Patent: Feb. 1, 2022

(54) AIRBAG DEVICE

(71) Applicant: Autoliv Development AB, Vargarda (SE)

(72) Inventors: Kazuki Morita, Kanagawa (JP); Keisuke Honma, Kanagawa (JP); Ryunosuke Tachiwana, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/753,373

(22) PCT Filed: Sep. 27, 2018

(86) PCT No.: PCT/JP2018/036067
§ 371 (c)(1),
(2) Date: Apr. 3, 2020

(87) PCT Pub. No.: WO2019/069796
PCT Pub. Date: Apr. 11, 2019

(65) Prior Publication Data
US 2020/0331420 A1    Oct. 22, 2020

(30) Foreign Application Priority Data

Oct. 5, 2017 (JP) .............................. JP2017-195185
Mar. 21, 2018 (JP) .............................. JP2018-053694

(51) Int. Cl.
*B60R 21/2346* (2011.01)
*B60R 21/203* (2006.01)
(Continued)

(52) U.S. Cl.
CPC ........ *B60R 21/2346* (2013.01); *B60R 21/203* (2013.01); *B60R 21/217* (2013.01); *B60R 21/2338* (2013.01); *B60R 21/26* (2013.01)

(58) Field of Classification Search
CPC . B60R 21/2346; B60R 21/203; B60R 21/217; B60R 21/2338; B60R 21/26
See application file for complete search history.

(56) References Cited

U.S. PATENT DOCUMENTS 6,302,433 B1    10/2001   Ellerbrok et al.
6,610,000 B1    8/2003    Ishii et al.
(Continued)

FOREIGN PATENT DOCUMENTS

DE    102014001781    8/2015
JP    H9-263204 A     10/1997
(Continued)

OTHER PUBLICATIONS

International Search Report of the International Searching Authority for PCT/JP2018/036067 dated Dec. 11, 2018.
(Continued)

*Primary Examiner* — Drew J Brown
(74) *Attorney, Agent, or Firm* — Stoel Rives LLP

(57) ABSTRACT

[Object]. An object is to suitably control the deployment shape of an airbag, thereby improving the occupant restraining performance. Another object is to reduce damage to an occupant located close to a steering wheel or an instrument panel.
[Solving Means]. An airbag device according to the present invention includes: a gas generator that generates expansion gas; an airbag that expands and deploys due to the expansion gas to restrain an occupant; and a diffuser disposed inside the airbag to control a flow of the expansion gas. Given that a direction toward the occupant is a first direction, the diffuser includes a receiving surface disposed between the gas generator and the airbag in the first direction to receive the expansion gas discharged from the gas generator; and a plurality of band-like connecting members having one end (Continued)

connected to an edge of the receiving surface and the other end directly or indirectly connected to the gas generator.

17 Claims, 20 Drawing Sheets

(51) Int. Cl.
*B60R 21/217* (2011.01)
*B60R 21/2338* (2011.01)
*B60R 21/26* (2011.01)

(56) References Cited

U.S. PATENT DOCUMENTS

| | | | |
|---|---|---|---|
| 8,764,057 B1 | 7/2014 | Jamison et al. | |
| 9,676,362 B1 | 6/2017 | Deng et al. | |
| 2002/0005639 A1 | 1/2002 | Varcus | |
| 2003/0151233 A1* | 8/2003 | Varcus | B60R 21/2346 280/729 |
| 2004/0164526 A1 | 8/2004 | Hasebe et al. | |
| 2005/0052008 A1* | 3/2005 | Rose | B60R 21/2346 280/740 |
| 2005/0073139 A1 | 4/2005 | Fischer et al. | |
| 2005/0116455 A1* | 6/2005 | Abe | B60R 21/233 280/743.1 |
| 2005/0285379 A1 | 12/2005 | Soderquist | |
| 2006/0249934 A1 | 11/2006 | Hasabe | |
| 2007/0222196 A1* | 9/2007 | Harvey | B60R 21/2346 280/740 |
| 2008/0048420 A1 | 2/2008 | Washino | |
| 2008/0073890 A1 | 3/2008 | Williams et al. | |
| 2008/0073892 A1 | 3/2008 | Rose et al. | |
| 2008/0303256 A1 | 12/2008 | Williams | |
| 2012/0126516 A1* | 5/2012 | Choi | B60R 21/2338 280/730.2 |
| 2013/0221645 A1 | 8/2013 | Yamada | |
| 2014/0265280 A1 | 9/2014 | Borton et al. | |
| 2014/0284905 A1 | 9/2014 | Yamaji et al. | |
| 2014/0375035 A1 | 12/2014 | Fukawatase et al. | |
| 2015/0137489 A1* | 5/2015 | Vinton | B60R 21/2346 280/728.2 |
| 2015/0239422 A1 | 8/2015 | Ishiguro et al. | |
| 2015/0283972 A1 | 10/2015 | Fischer et al. | |
| 2016/0121840 A1 | 5/2016 | Iida | |
| 2017/0057455 A1 | 3/2017 | Lachat et al. | |
| 2018/0001865 A1* | 1/2018 | Ooka | B60R 21/2346 |
| 2019/0001915 A1* | 1/2019 | Hotta | B60R 21/237 |
| 2020/0031306 A1 | 1/2020 | Nakajima et al. | |
| 2020/0101928 A1* | 4/2020 | Ishii | B60R 21/2338 |
| 2021/0122319 A1 | 4/2021 | Hess et al. | |

FOREIGN PATENT DOCUMENTS

| | | | | |
|---|---|---|---|---|
| JP | 10100838 | | 4/1998 | |
| JP | 2000-127881 A | | 5/2000 | |
| JP | 2002-29354 A | | 1/2002 | |
| JP | 2002053000 A | * | 2/2002 | ......... B60R 21/2346 |
| JP | 2002-362274 A | | 12/2002 | |
| JP | 2004148858 A | * | 5/2004 | ........... B60R 21/233 |
| JP | 2011-5923 A | | 1/2011 | |
| JP | 2011126307 A | * | 6/2011 | ......... B60R 21/2346 |
| JP | 2013086708 A | * | 5/2013 | ........... B60R 21/233 |
| JP | 2014065433 | | 4/2014 | |
| JP | 2016-88173 A | | 5/2016 | |
| JP | 2016112996 | | 10/2019 | |
| KR | 20100064837 | | 6/2010 | |
| WO | 2000015472 | | 3/2000 | |
| WO | 2006132071 | | 12/2006 | |
| WO | 2006132280 | | 12/2006 | |
| WO | 2007067371 A2 | | 6/2007 | |
| WO | 2009056598 | | 5/2009 | |
| WO | 2009146220 | | 12/2009 | |
| WO | 2016168124 | | 10/2016 | |
| WO | 2021086613 | | 5/2021 | |

OTHER PUBLICATIONS

English translation of International Search Report of the International Searching Authority for PCT/JP2018/036067 dated Dec. 11, 2018.

International Search Report and Written Opinion dated Dec. 1, 2020 for international application PCT/US2020/055591.

HESS, Notice of Allowance dated Oct. 6, 2021 for U.S. Appl. No. 16/665,953.

Hess, et al., Notice of Allowance dated Jun. 18, 2021 for U.S. Appl. No. 16/665,953.

Hess, et al., Office Action dated Mar. 3, 2021 for U.S. Appl. No. 16/665,953.

* cited by examiner (A)

(B)

(A)

(B)

(C)

(D)

(A)

(B)

(A)

(B)

(A)

(B)

(A)

(B)

(A)

A1-A1

(B)

A2-A2

AIRBAG DEVICE

TECHNICAL FIELD

The present invention relates to a vehicle airbag device, in particular, a front airbag device deploying in front of an occupant.

BACKGROUND

In order to protect passengers in the event of a vehicle accident, it is well known that vehicles are equipped with one or more airbags. These airbags include various forms such as: a so-called driver airbag that expands from the vicinity of the steering wheel of an automobile to protect the driver; a curtain airbag that deploys downward on the inner side of the window of the automobile to protect an occupant at lateral shock and turning as well as overturning of the automobile, and a side airbag that deploys on the side of the occupant (the side of a seat) to protect the occupant at lateral shock of the vehicle.

In the so-called front airbag devices such as the driver airbag and a passenger-side airbag that protects the passenger on the seat next to the driver seat, it is required that the quick deployment of an airbag restrain an occupant and reduce damage to the occupant drawn into this airbag.

However, depending on driving positions, such as in the case of a small-sized driver, the driver may be close to the steering wheel. In such circumstances, when the airbag is deployed from the steering wheel to the driver side, the driver may be damaged significantly. In addition, since a sufficient space cannot be ensured between the steering wheel and the driver to be protected, the airbag may not spread quickly in a plane parallel to the steering wheel. This may adversely affect quick restraint of the driver's chest and head, worsening damage. Such problems can also occur in the passenger-side airbag device for the occupant seated close to the instrument panel.

DISCLOSURE OF THE INVENTION

Problem to be Solved by the Invention

The present invention is devised in view of the circumstances described above, and an object of the present invention is to suitably control the deployment behavior and shape of the airbag, thereby improving the occupant restraining performance.

Another object of the present invention is to reduce damage to an occupant located close to a steering wheel or instrument panel.

Means for Solving the Problem

In order to achieve the above-described object, an airbag device according to the present invention includes: a gas generator that generates expansion gas; an airbag that expands and deploys due to the expansion gas to restrain an occupant; and a diffuser disposed inside the airbag to control a flow of the expansion gas. Given that a direction toward the occupant is a first direction, the diffuser includes: a receiving surface disposed between the gas generator and the airbag in the first direction to receive the expansion gas discharged from the gas generator; and a plurality of band-like connecting members having one end connected to an edge of the receiving surface and the other end directly or indirectly connected to the gas generator.

The connecting members may be configured to restrict movement of the receiving surface in the first direction, and the expansion gas against the receiving surface is guided from an opening formed between the adjacent connecting members into the airbag. Here, by making a width of the opening larger than the width of the connecting member, the diffuser may have a different function from the so-called inner airbag, facilitating adjustment of the flow direction and the amount of the gas.

"Direction toward an occupant" means, for example in the case of the driver airbag, a direction perpendicular to a surface including a rim of a steering wheel or a direction slightly inclined from the perpendicular direction. In the case of the passenger-side airbag, the direction means a direction perpendicular to the surface of the instrument panel (the airbag cover) or a direction slightly inclined from the perpendicular direction.

Also, "directly or indirectly connected to the gas generator" includes being connected to a retainer of the gas generator with a bolt or the like, and being fixed via another member. When the gas generator is operated, the connecting members need to be fixed with a fixing strength so as not to be disconnected due to the expansion gas.

When the airbag is viewed from the occupant, given that a 12 o'clock position and a 6 o'clock position in a plane perpendicular to the first direction are a position directly above the occupant and a position directly below the occupant, the openings may be formed at 12 o'clock, 3 o'clock, 6 o'clock, and 9 o'clock positions, and an area of the openings formed at the 12 o'clock and 6 o'clock positions may be set to be larger than an area of the openings formed at the 3 o'clock and 9 o'clock positions.

Here, the 12 o'clock, 3 o'clock, 6 o'clock, and 9 o'clock positions refer to positions on a clock face, to which the steering wheel is likened. In other words, in the steering orientation at forward travelling of the vehicle, the upper or travelling direction is defined as the 12 o'clock position, the position rotated clockwise from the 12 o'clock position by 90 degrees is defined as the 3 o'clock position, the position rotated clockwise from the 12 o'clock position by 180 degrees is defined as the 6 o'clock position, and the position rotated clockwise from the 12 o'clock position by 270 degrees is defined as the 9 o'clock position.

Note that in the diffuser of the present invention, the receiving surface is connected to the gas generator with the band-like connecting members, however, this is completely different from a bag-shaped rectifying member such as a so-called inner bag. Structurally, according to the present invention, there is no wall region from the edge of the receiving surface and the diffuser is deployed in a parachute shape. In this way, when the diffuser is likened to the parachute, the "receiving surface" corresponds to an umbrella body, and the "connecting members" correspond to suspension straps or lines.

According to the invention as described above, when the airbag device is operated, the gas discharged from the gas generator impinges on the receiving surface of the diffuser prior to filling the entire airbag and then, flows towards the openings of the connecting members. Thus, the airbag deploys quickly in a planar direction (the direction perpendicular to the first direction) at an initial stage of deployment. Thus, even when the occupant is seated close to the airbag device (the steering wheel or the instrument panel), the airbag may be quickly introduced into the chest or abdomen of the occupant, and restrain the occupant with a wide area.

In addition, since the pressure directed directly to the occupant by the expanded airbag is temporarily received by the receiving surface of the diffuser, it is possible to minimize damage to the occupant even when the occupant is seated close to the airbag device (the steering wheel or the instrument panel).

The receiving surface may be circular.

At deployment of the airbag, the receiving surface of the diffuser may curve like a parachute and the connecting members may form concave and convex portions radially extending to the receiving surface. At this time, since the gas flows along the rib-like irregular channels radially extending from the center of the receiving surface, the flow direction of the expansion gas may be controlled more accurately by adjusting the thickness of the connecting members and the connecting positions with the receiving surface.

The diffuser may further include a base that surrounds the gas generator and guides the expansion gas in the first direction, and the other ends of the connecting members may be connected to the base. Here, the base and the connecting member may be integrally molded.

A housing that houses the airbag, and a retainer that holds the gas generator relative to the housing may be further provided. The retainer may include a wall portion that surrounds the gas generator and guides the expansion gas in the first direction. At this time, the other ends of the connecting members may be connected to the retainer.

Preferably, a central position of the receiving surface substantially coincides with a central position of the airbag in the plane perpendicular to the first direction. As a result, the gas controlled by the diffuser may be uniformly dispersed, thereby accurately controlling the deployment behavior (deployment shape) of the airbag.

A tether that regulates movement of the airbag in the first direction may be further provided, and one end of the tether may be connected to an occupant-side surface of the airbag. Here, it is preferred that the tether be two or more and the two or more tethers are connected to the airbag at a location that does not substantially inhibit gas flow through the opening.

In addition, preferably, a central position of the receiving surface substantially coincides with a central position of a virtual circumscribing circle of the two or more tethers in the plane perpendicular to the first direction.

The deployment behavior (deployment configuration) of the airbag is further stabilized by defining the relationship between the receiving surface of the diffuser and the connecting portion of the tether to the airbag as described above.

BRIEF DESCRIPTION OF THE DRAWINGS

FIG. 3A is a plan view of a receiving surface, and FIG. 3B is a plan view of connecting members (including a base).

FIG. 4A illustrates the state viewed from diagonally above, FIG. 4B illustrates the state viewed from directly above, FIG. 4C illustrates the state viewed from below (inflator), and FIG. 4D illustrates the state viewed from side. Note that in FIG. 4C, the inflator is omitted.

FIG. 5A illustrates the state viewed from directly above, and FIG. 5B illustrates the state viewed from side.

FIG. 6A illustrates a cross section taken along A-A in FIG. 5, and FIG. 6B illustrates a cross section taken along B-B in FIG. 5.

FIG. 7A is a plan view of a receiving surface, and FIG. 7B is a plan view of connecting members (including a base).

FIG. 8A illustrates the state viewed from directly above, and FIG. 8B illustrates the state viewed from side.

FIG. 9A is a plan view of a receiving surface, and FIG. 9B is a plan view of connecting members (including a base).

FIG. 10A illustrates the state viewed from directly above, and FIG. 10B illustrates the state viewed from side.

FIG. 11A is a plan view of a receiving surface, and FIG. 11B is a plan view of connecting members (including a base).

FIG. 12A is a plan view illustrating positional relationship between the receiving surface and the airbag, and FIG. 12B is a plan view illustrating positional relationship between connecting portions of tethers to the airbag and the receiving surface of the diffuser.

FIG. 13A is a side view (cross sectional view) illustrating the deployed state of the airbag, FIG. 13B is a plan view illustrating positional relationship between connecting portions of the tethers to the airbag and the receiving surface of the diffuser.

FIG. 16A is a plan view of a receiving surface, and FIG. 16B is a plan view of connecting members (including a base).

FIG. 17A illustrates the state viewed from directly above, and FIG. 17B illustrates the state viewed from side.

FIG. 20A illustrates a cross section taken along A1-A1 in FIG. 19, and FIG. 20B illustrates a cross section taken along A2-A2 in FIG. 19.

DESCRIPTION OF THE PREFERRED EMBODIMENT

An airbag device according to an embodiment of the present invention will be described with reference to accompanying drawings. Note that "front" displayed in each figure denotes the front (traveling direction) of a vehicle, and "rear" denotes the rear (the opposite direction to the traveling direction) of the vehicle.

"12 o'clock", "3 o'clock", "6 o'clock", and "9 o'clock" each correspond to a position on a clock when a steering wheel (or a surface perpendicular to an airbag deployment direction) is viewed from a driver.

Figure 1:
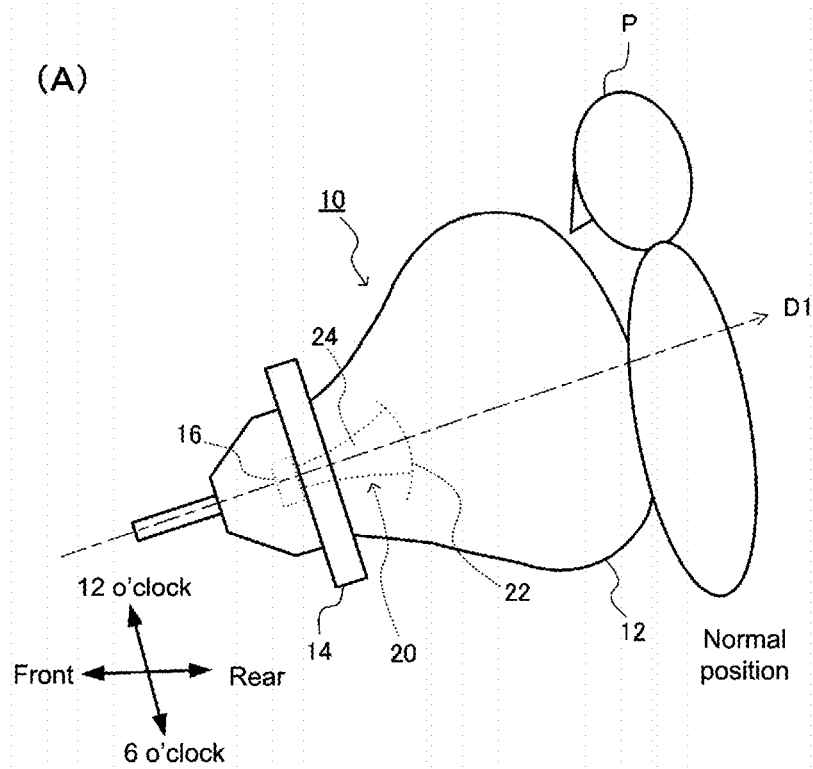
FIG. 1A is a side view (cross sectional view) schematically illustrating the deployed state of an airbag device according to the present invention in the state where a driver is seated with a normal distance from a steering wheel.
FIG. 1B is a plan view illustrating an appearance of a steering wheel.
Figure 1:
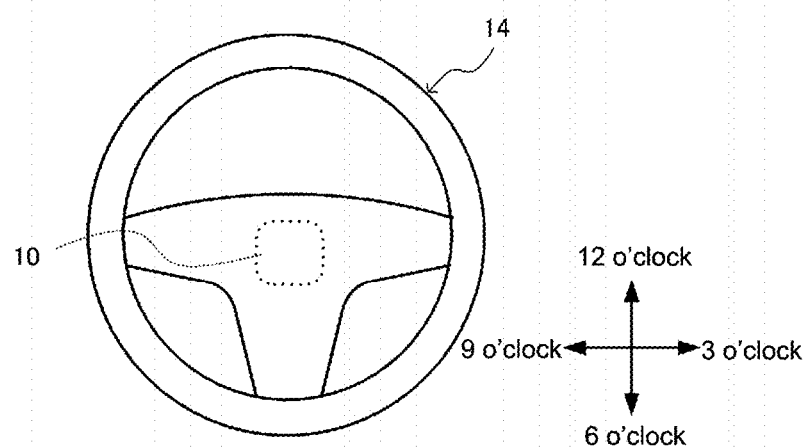
Figure 2:
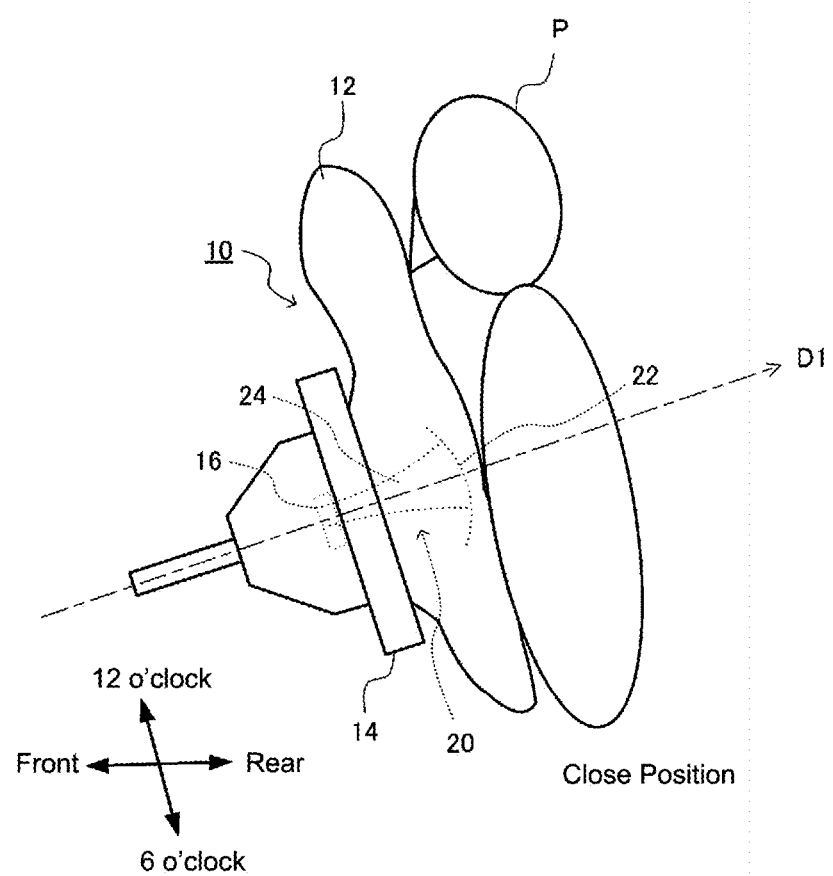
FIG. 2 is a side view (cross sectional view) schematically illustrating the deployed state of the airbag device according to the present invention in the state where the driver is seated closer to the steering wheel than normal.

FIG. 1A is a side view (cross sectional view) schematically illustrating the deployed state of an airbag device 10 according to the present invention in the state where a driver P is seated with a normal distance from a steering wheel 14. FIG. 1B is a plan view illustrating an appearance of the steering wheel 14. FIG. 2 is a side view (cross sectional view) schematically illustrating the deployed state of the airbag device 10 according to the present invention in the state where the driver P is seated closer to the steering wheel 14 than normal.

The side airbag device 10 according to the present example includes an inflator 16 that generates expansion gas, an airbag 12 that expands and deploys due to the expansion gas to restrain the occupant P, and a diffuser 20 disposed inside the airbag 12 to control a flow of the expansion gas. Given that a direction toward the occupant P is a first direction D1 (a direction perpendicular to a plane including a rim of the steering wheel 14), the diffuser 20 includes a receiving surface 22 disposed between the inflator 16 and the airbag 12 in the first direction D1 to receive the expansion gas discharged from the inflator 16, and a plurality of band-like connecting members 24 having one end connected to an edge of the receiving surface 22 and the other end directly or indirectly connected to the gas generator 16.

The connecting members 20 restrict movement of the circular receiving surface 22, which is made of the same fabric as the airbag 12, in the first direction D1, and the expansion gas against the receiving surface 22 is guided into the airbag 12 from the gaps (openings) of the connecting member 24.

Example 1

Figure 3:
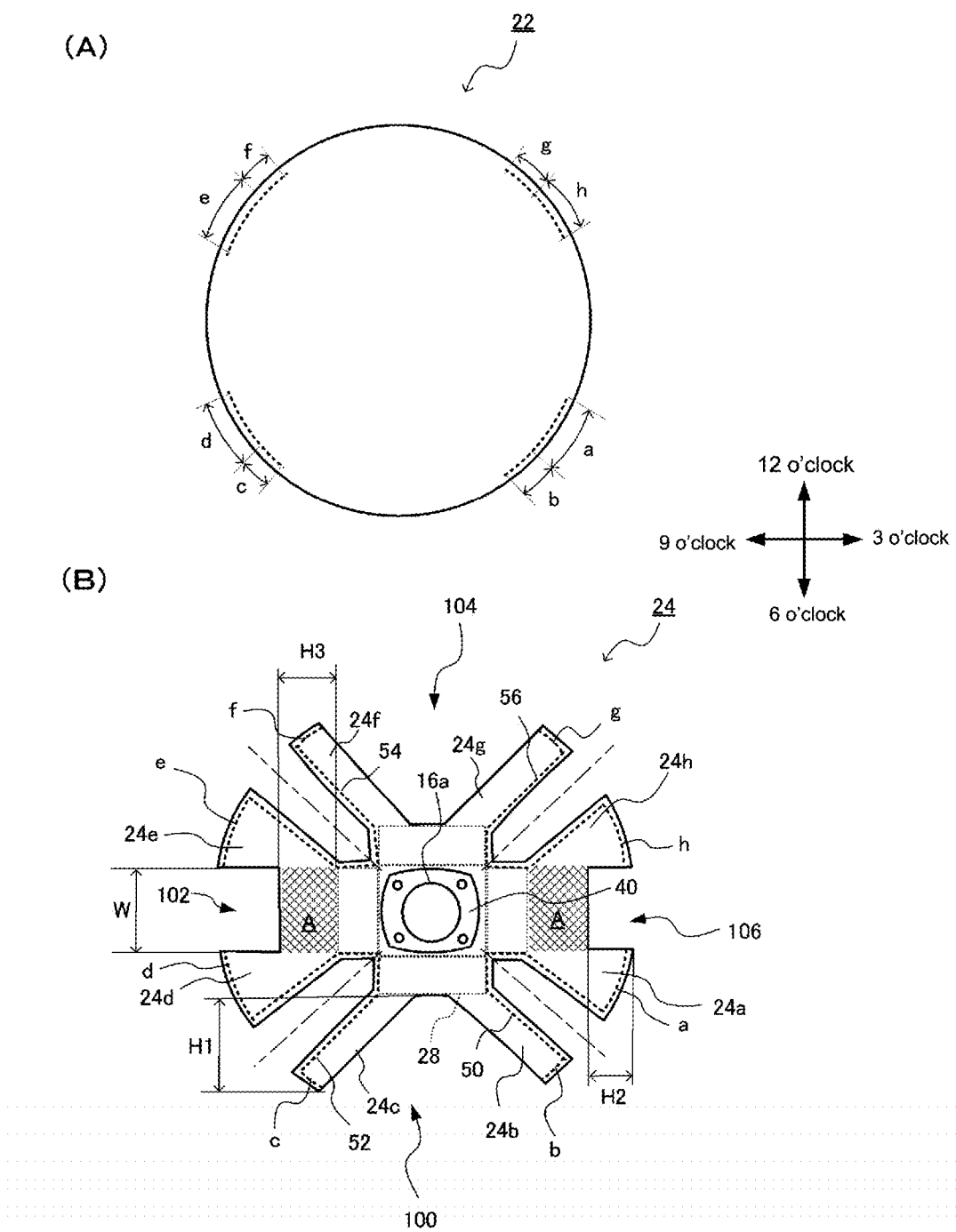
FIG. 3 illustrates the structure of a diffuser used in the airbag device according to Example 1 of the present invention.
Figure 4:
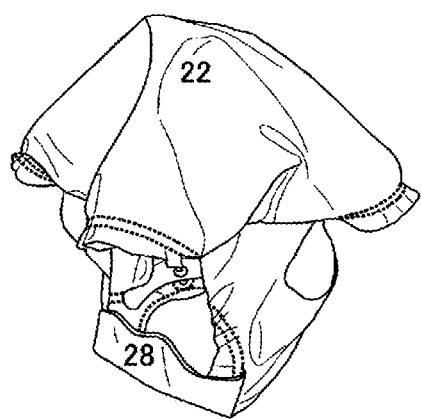
FIG. 4 shows photographs illustrating the deployed state (operating state) of the diffuser used in the airbag device according to Example 1 of the present invention.
Figure 4:
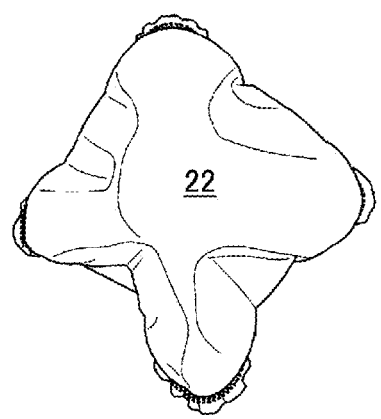
Figure 4:
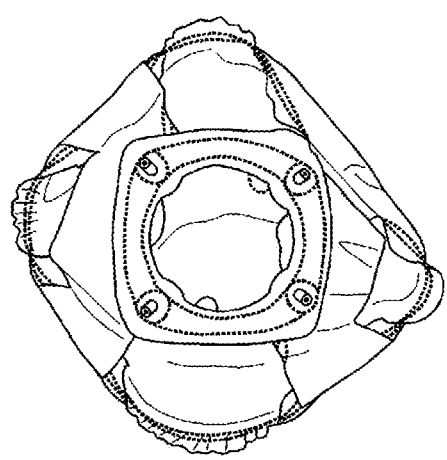
Figure 4:
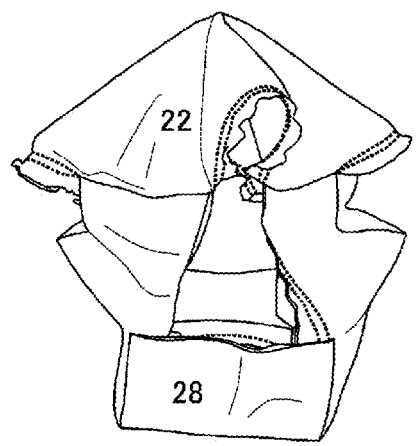
Figure 5:
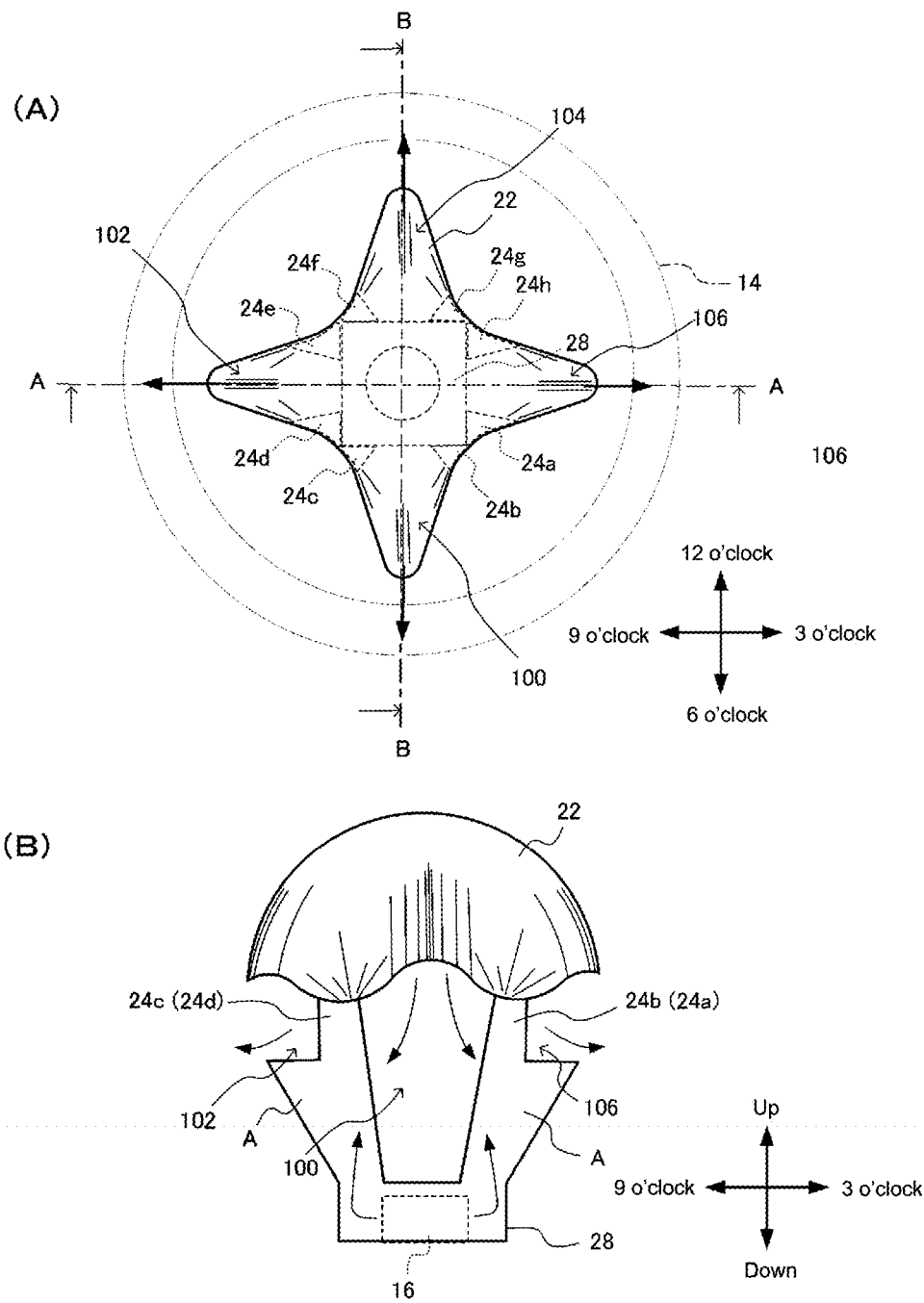
FIG. 5 shows views illustrating the deployed state (operating state) of the diffuser used in the airbag device according to Example 1 of the present invention.
Figure 6:
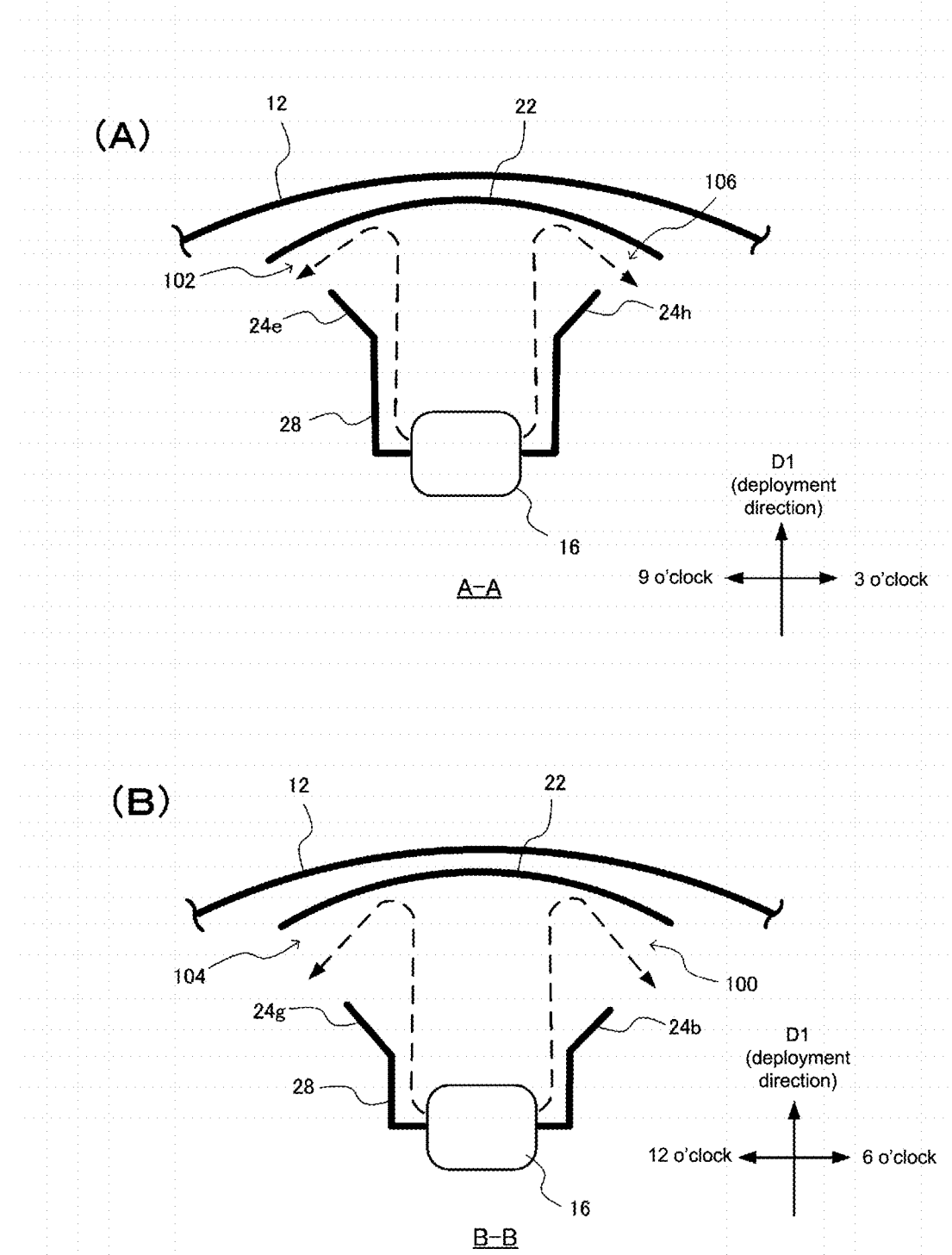
FIG. 6 shows cross sectional views illustrating the structure and function of the diffuser employed in the driver airbag according to Example 1 of the present invention.

FIG. 3 illustrates the structure of the diffuser 20 used in the airbag device according to Example 1 of the present invention, FIG. 3A is a plan view of the receiving surface 22, and FIG. 3B is a plan view of the connecting members 24 (including the base). FIG. 4 shows photographs illustrating the deployed state (operating state) of the diffuser 20, FIG. 4A illustrates the state viewed from diagonally above, FIG. 4B illustrates the state viewed from directly above, FIG. 4C illustrates the state viewed from below (the inflator 16), and FIG. 4D illustrates the state viewed from side. Note that in FIG. 4 C, the inflator 16 is omitted. FIG. 5 illustrates the deployed state (operating state) of the diffuser 20, FIG. 5A illustrates the state viewed from directly above, and FIG. 5B illustrates the state viewed from side. Furthermore, FIG. 6 shows cross sectional views illustrating the structure and function of the diffuser employed in the driver airbag according to Example 1 of the present invention, FIG. 6A is a cross sectional view taken along A-A in FIG. 5, and FIG. 6B is a cross sectional view taken along B-B in FIG. 5.

As illustrated in FIG. 3B, the connecting members 24 of the diffuser 20 include band-like or partially fan-shaped connecting portions 24a, 24b, 24c, 24d, 24e, 24f, 24g, and 24h. The connecting portions 24a to 24h are connected and fixed to portions indicated by alphabets a to h on the receiving surface 22, respectively, by sewing or the like. Moreover, the connecting portions 24a and 24b, 24c and 24d, and 24e and 24f are sewn together along line 50, 52, 54, and 56 indicated by opposing dotted lines.

As can be seen from the connected (sewn) locations a to h in FIG. 3A, sewing lengths (a+b), (c+d), (e+f), and (g+h) of the connecting portions 24a to 24h and the receiving surface 22 each are shorter than a length of the unsewn portion, thereby ensuring wide openings (100, 102, 104, and 106) through which gas flows. In particular, the opening (unsewn length) 104 located at the 12 o'clock position and the opening (unsewn length) 100 located at the 6 o'clock position are larger than the openings (unsewn length) 106, 102 located at the 3 o'clock and 9 o'clock positions. Additionally, a height (depth) H1 of each of the openings 100, 104 is made larger than a height (depth) H2 of each of the openings 102,106, thereby increasing the opening area in the 12 o'clock and 6 o'clock directions.

With respect to the opening 106 formed at the 3 o'clock position and the opening 102 formed at the 9 o'clock position, a region A such as a standing wall is formed above the base 28, and the area of the openings 102, 106, that is, the flow rate of the gas to be discharged, may be adjusted by changing a width W and a height H3 of this region A. Note that the region A may be recognized as an extended region of the base 28.

In the present example, within the airbag 12, more gas flows toward the driver's head (12 o'clock) and the driver's abdomen (6 o'clock), promoting deployment of the airbag 12 in these directions. Also, the opening 100 formed at the 6-o'clock position may be made larger than the opening 104 formed at the 12 o'clock position, in which case the airbag 12 may be deployed from the occupant's chest to the occupant's abdomen more quickly.

A retainer 40 having a hole 16a into which the inflator 16 is inserted is formed at the center of the connecting members 24. Additionally, as illustrated in FIGS. 4 to 6, the sidewall-shaped base 28 extending vertically is formed integrally with the connecting portions 24a to 24h so as to surround the periphery of the inflator 16. The base 28 is formed by raising the upper, lower, left, and right connecting portions 24a to 24f of the connecting members 24 along folding lines surrounding the retainer 40.

The inflator 16 is cylindrical, and a plurality of gas discharge ports (not illustrated) are formed on its side surface, such that gas is radially discharged from the center.

The base 28 guides the gas discharged from the side wall of the inflator 16 upward (D1 direction), that is, toward the receiving surface 22.

Note that in the diffuser of the present invention, the receiving surface is connected to the gas generator with the band-like connecting members, however, this is completely different from a bag-shaped rectifying member such as a so-called inner bag. Structurally, according to the present invention, there is no wall region from the edge of the receiving surface and the diffuser is deployed in a parachute shape.

In this example, when the airbag device 10 is operated, the gas discharged from the inflator 16 impinges on the receiving surface 22 of the diffuser 20 prior to filling the entire airbag 12. At this time, as illustrated in FIG. 4, the receiving surface 22 of the diffuser 20 curves like a parachute, and the connecting portions 24a to 24h form concave and convex portions radially extending to the receiving surface 22. The portions of the receiving surface 22, where the connecting portions 24a to 24h are not sewn, form obliquely downward openings (100, 102, 104, and 106) like a bird's bill. The gas reflected at the receiving surface 22 flows into the inside of the airbag 12 along the channel-like openings (100, 102, 104, and 106) extending radially from the center.

This allows the airbag 12 to deploy quickly in the planar direction (the direction perpendicular to the first direction D1) at the initial stage of deployment, enabling the airbag 12 to quickly in front of the occupant's chest and abdomen and to restrict the occupant with a wide area, even when the occupant is seated close to the steering wheel 14. In addition, since the pressure directed directly to the occupant side by the expanded airbag 12 is temporarily received by the receiving surface 22 of the diffuser 20, damage to the occupant may be minimized.

Example 2

Figure 7:
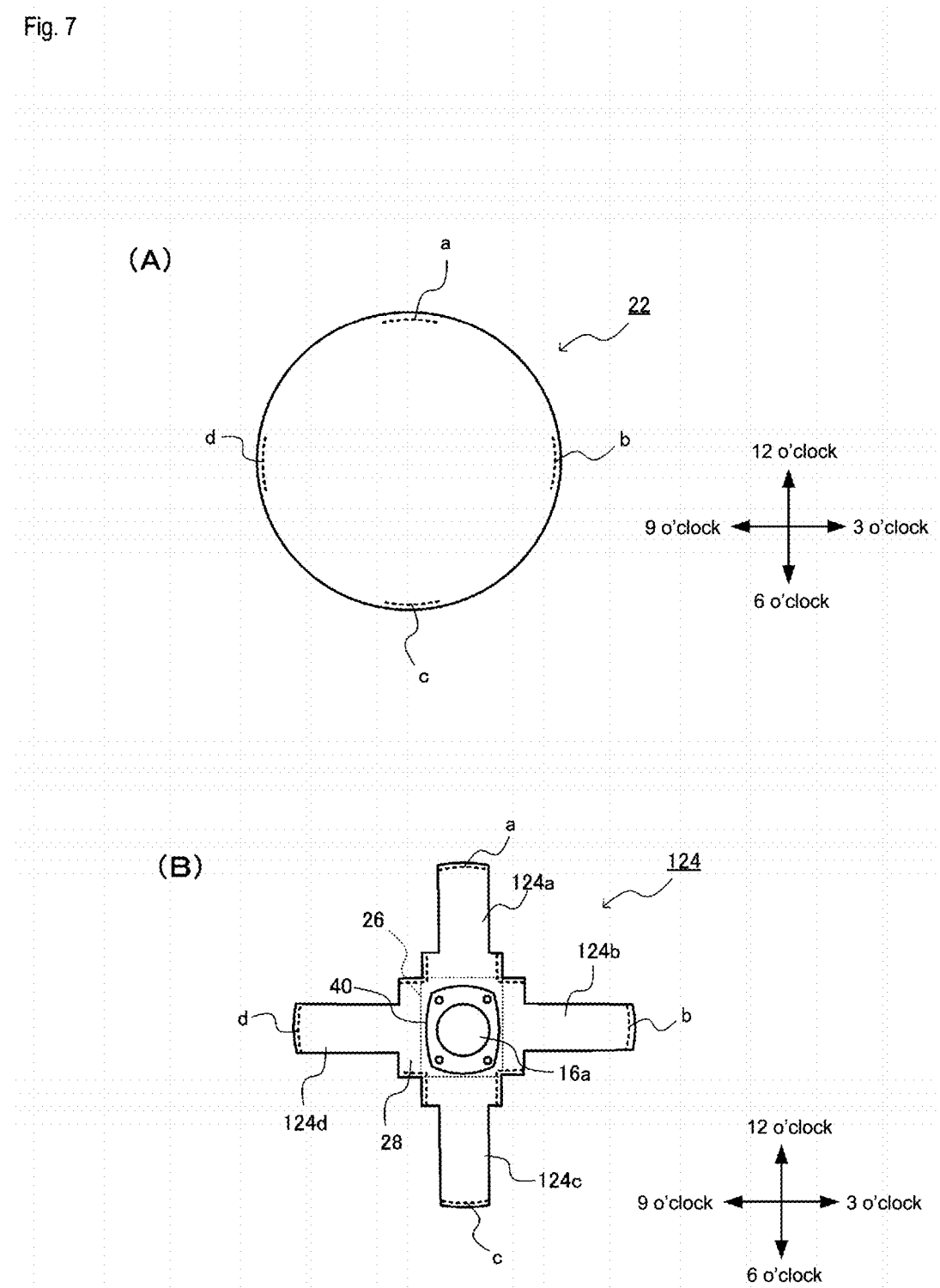
FIG. 7 illustrates the structure of a diffuser used in an airbag device according to Example 2 of the present invention.
Figure 8:
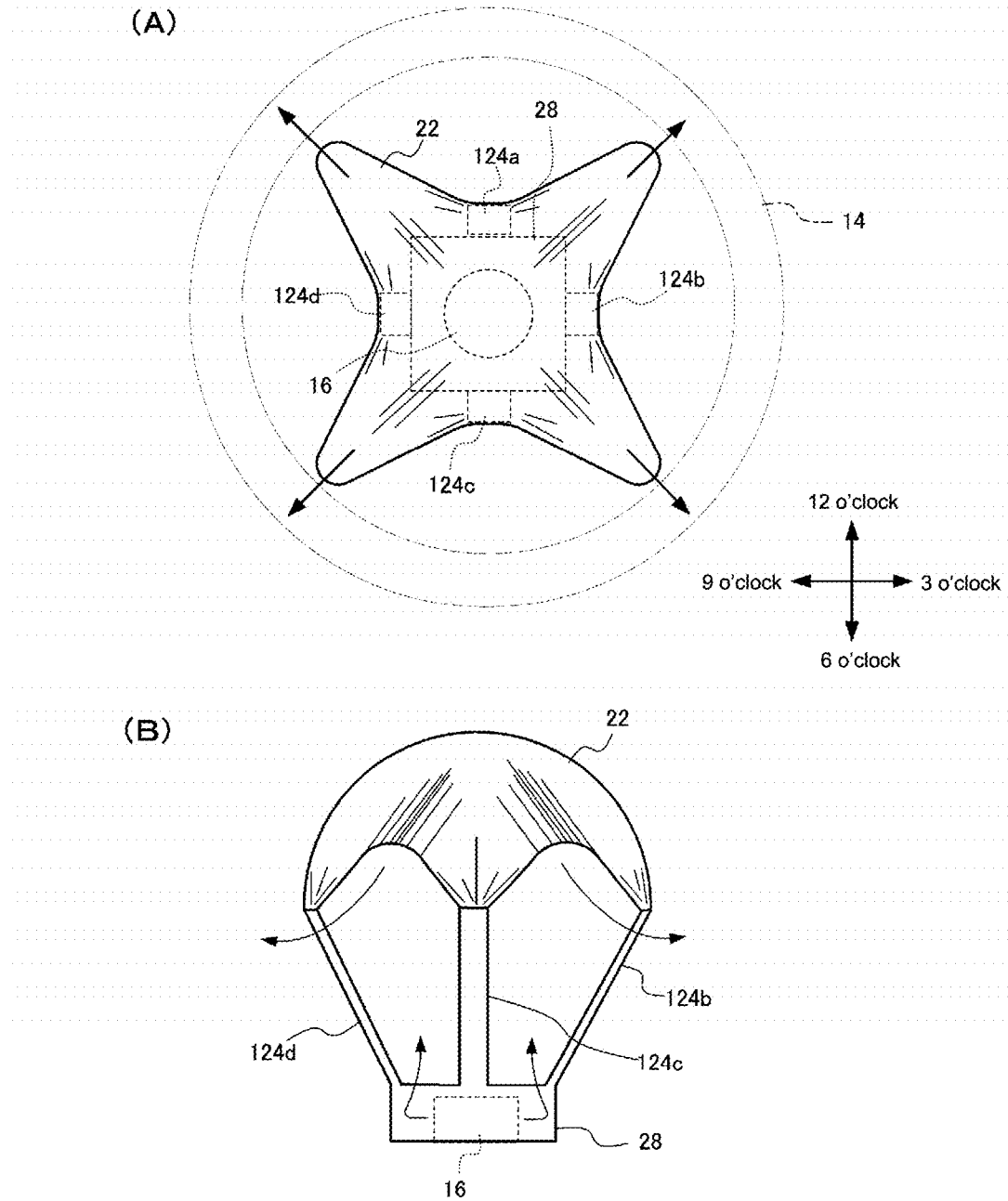
FIG. 8 shows views illustrating the deployed state (operating state) of the diffuser used in the airbag device according to Example 2 of the present invention.

FIG. 7 illustrates the structure of a diffuser used in the airbag device according to Example 2 of the present invention, FIG. 7A is a plan view of the receiving surface 22, and FIG. 7B is a plan view of connecting members 124 (including the base). FIG. 8 illustrates the deployed state (operating state) of the diffuser according to Example 2, FIG. 8A illustrates the state viewed from directly above, and FIG. 8B illustrates the state viewed from side. In the present example, components identical or corresponding to those of Example 1 are labeled with identical symbols, with redundant descriptions thereof omitted.

A difference between Example 2 and Example 1 is mainly the form of the connecting members 124. As illustrated in FIG. 7B, in the present embodiment, four connecting members 124a, 124b, 124c, and 124d are disposed at the 12 o'clock, 3 o'clock, 6 o'clock, and 9 o'clock positions.

In the present embodiment, the four elongated connecting portions 124a, 124b, 124c, and 124d are connected to the receiving surface 22 of the diffuser 20. Thus, the side surface of the diffuser 20 opens widely like a parachute, and the gas that impinges on the receiving surface 22 is smoothly guided into the airbag 12 without remaining in the diffuser 20.

Example 3

Figure 9:
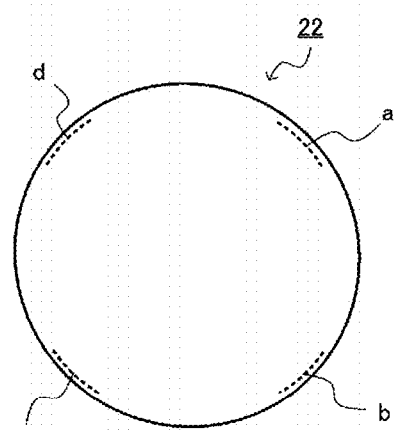
FIG. 9 illustrates the structure of a diffuser used in an airbag device according to Example 3 of the present invention.
Figure 9:
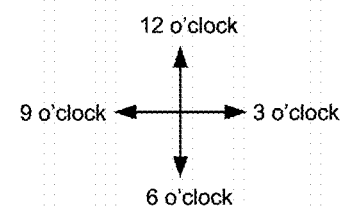
Figure 9:
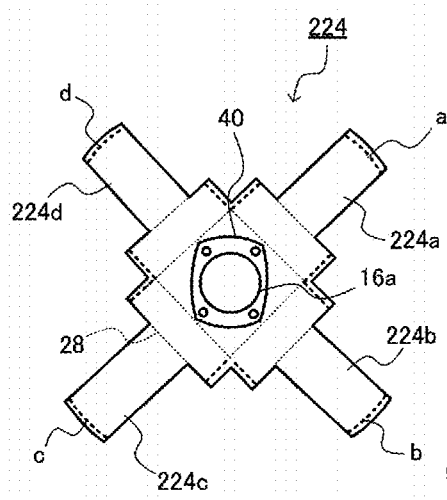
Figure 9:
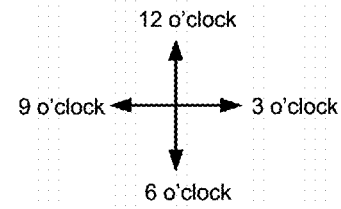
Figure 10:
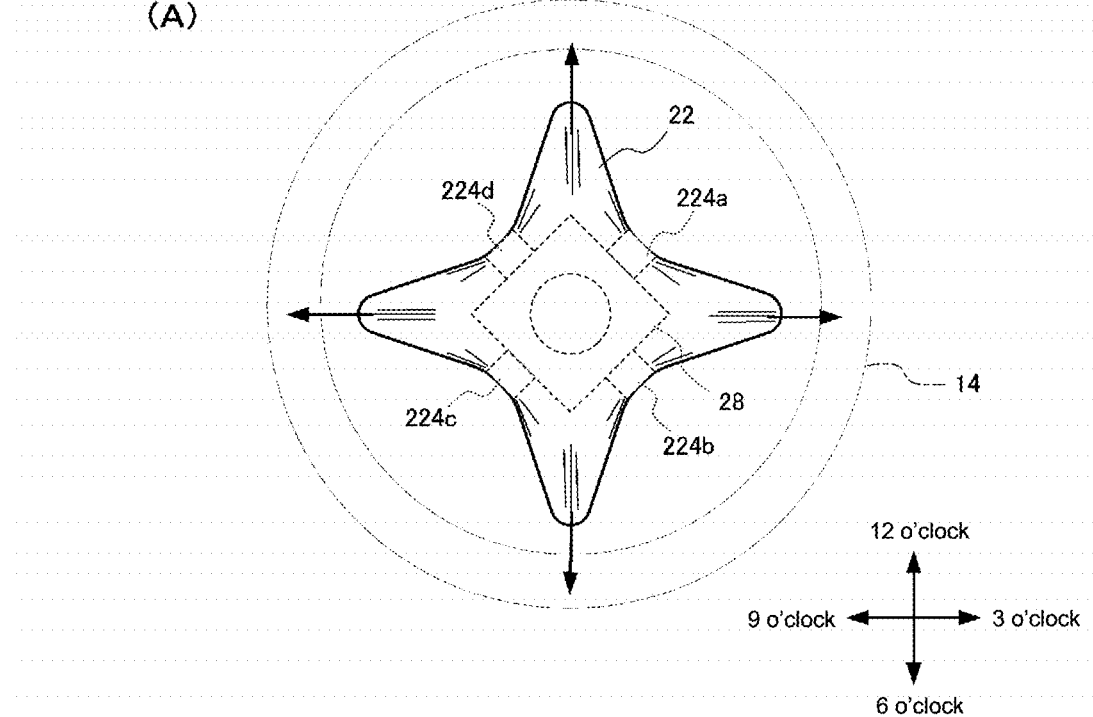
FIG. 10 shows views illustrating the deployed state (operating state) of the diffuser used in the airbag device according to Example 3 of the present invention.
Figure 10:
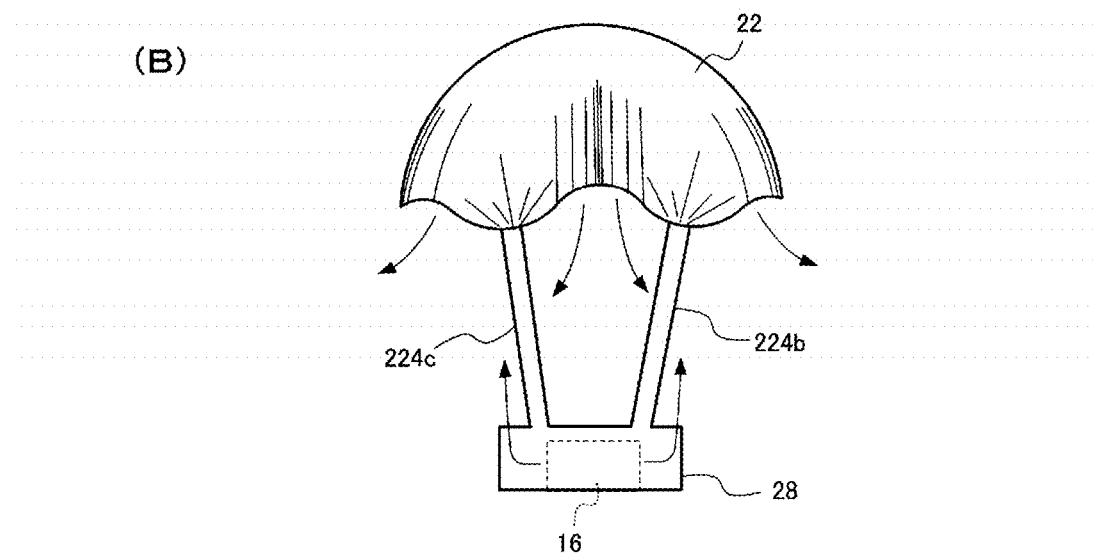

FIG. 9 illustrates the structure of a diffuser used in the airbag device according to Example 3 of the present invention, FIG. 9A is a plan view of the receiving surface 22, and FIG. 9B is a plan view of connecting members 224 (including the base). FIG. 10 illustrates the deployed state (operating state) of the diffuser according to Example 3, FIG. 10A illustrates the state viewed from directly above, and FIG. 10B illustrates the state viewed from side. In the present example, components identical or corresponding to those of Examples 1 and 2 are labeled with identical symbols, with redundant descriptions thereof omitted.

The configuration of the present example and Example 2 described above is common in many parts, and a difference is only the arrangement of the connecting members 224. As illustrated in FIG. 9B, in the present embodiment, the connecting member 224a is disposed between the 12 o'clock and 3 o'clock positions, the connecting member 224b is disposed between the 3 o'clock and 6 o'clock positions, the connecting member 224c is disposed between the 6 o'clock and 9 o'clock positions, and the connecting member 224d is disposed between the 9 o'clock and 12 o'clock positions. According to this example, the airbag 12 may be deployed quickly toward the occupant's head and abdomen.

Example 4

Figure 11:
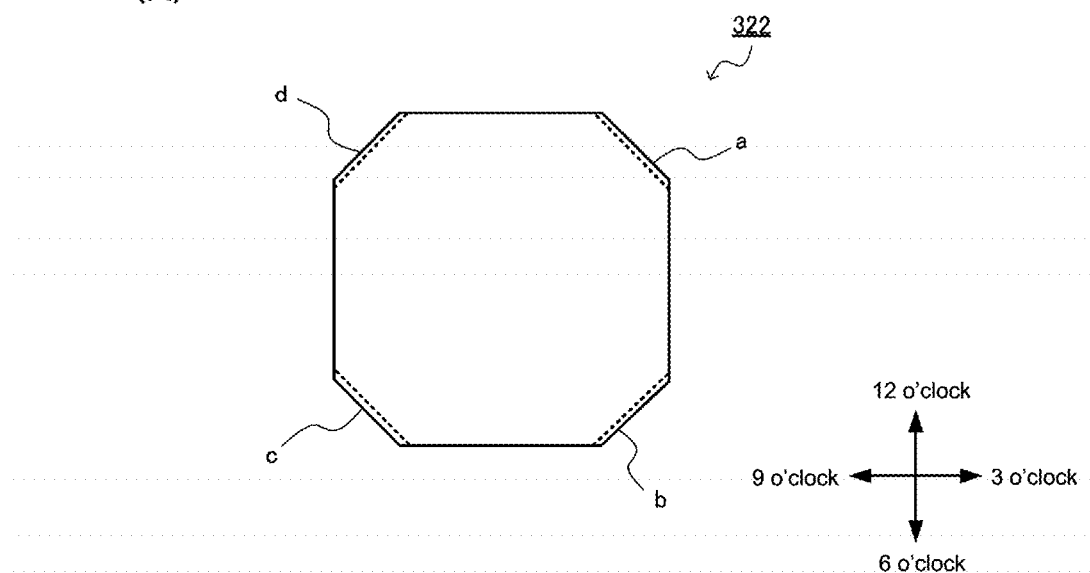
FIG. 11 illustrates the structure of a diffuser used in an airbag device according to Example 4 of the present invention.
Figure 11:
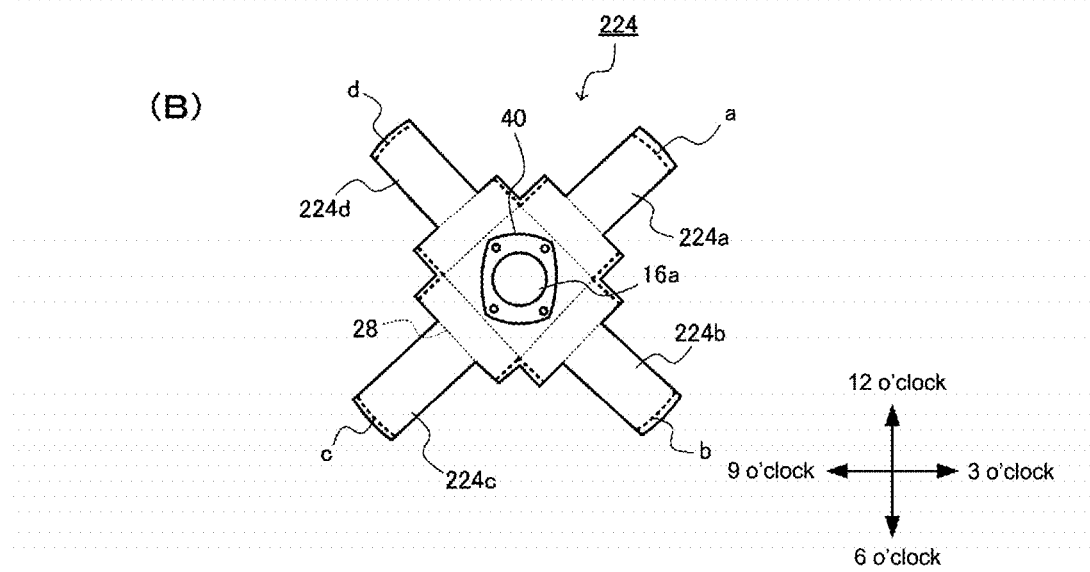

FIG. 11 illustrates the structure of a diffuser used in the airbag device according to Example 4 of the present invention, FIG. 11A is a plan view of the receiving surface 322, and FIG. 11B is a plan view of connecting members 224 (including the base). In the present example, components identical or corresponding to those of Examples 1 to 3 are labeled with identical symbols, with redundant descriptions thereof omitted.

The configuration of the present example and Example 3 described above is common in many parts, and a difference is only the shape of the receiving surface 322. As illustrated in FIG. 11A, in the present example, the receiving surface 322 is not circular, but is octagonal. This can also be said as the receiving surface 322 being shaped by chamfering four corners of a square.

(Other Aspects)

Figure 12:
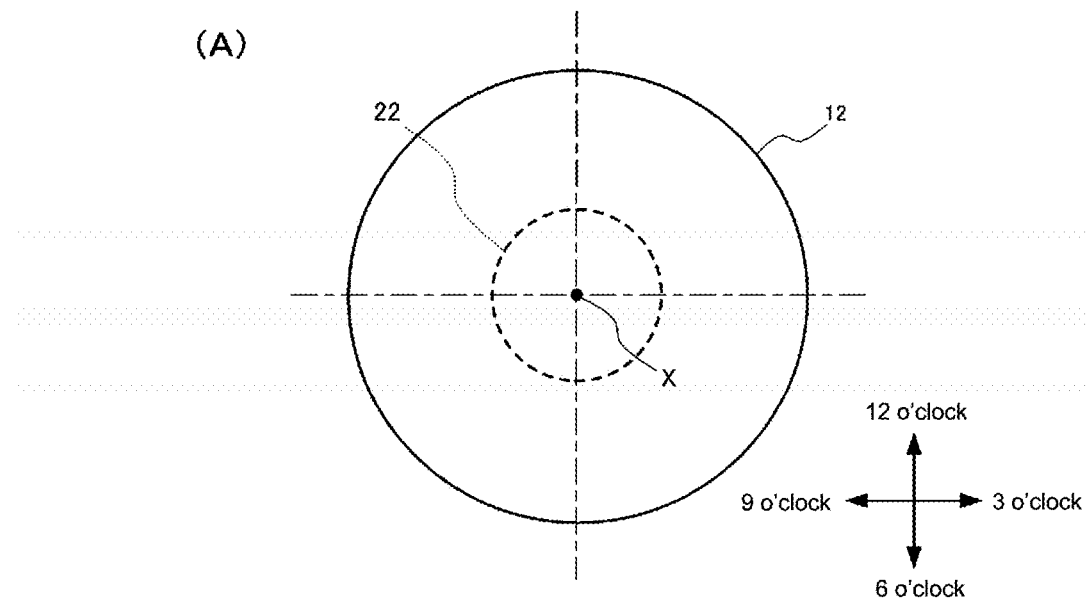
FIG. 12 illustrates a preferred aspect of the airbag device according to the present invention.
Figure 12:
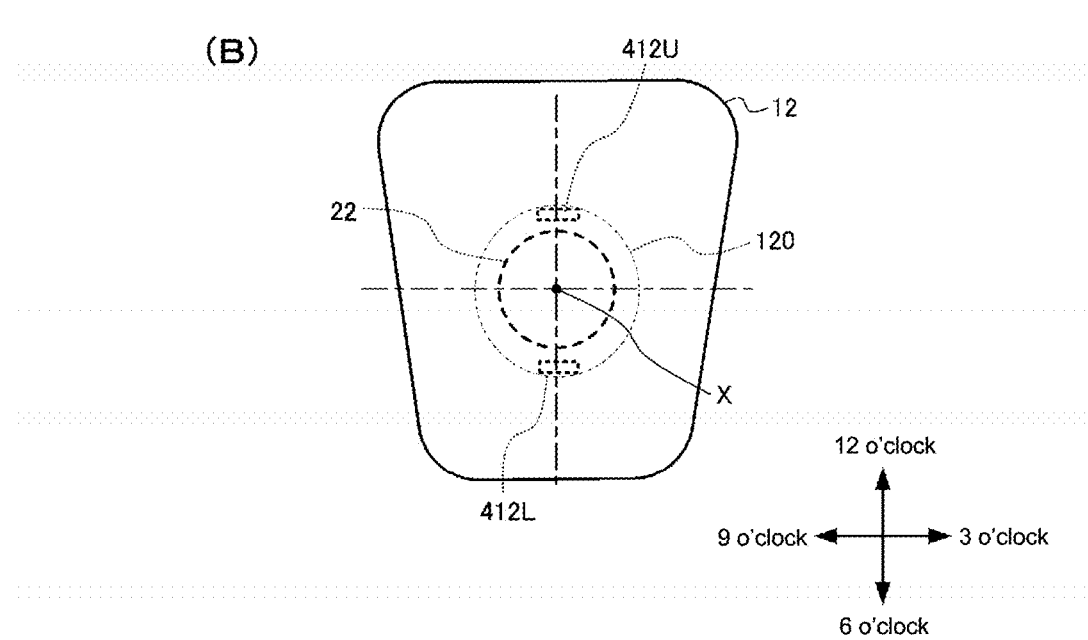

FIG. 12 illustrates a preferred aspect of the airbag device according to the present invention, FIG. 12A is a plan view illustrating positional relationship between the receiving surface 22 and the airbag 12, and FIG. 12B is a plan view illustrating positional relationship between connecting portions of tethers 412U, 412L to the airbag 12 and the receiving surface 22 of the diffuser.

In the aspect illustrated in FIG. 12A, a central position X of the receiving surface 22 of the diffuser 20 generally coincides with a central position X of a front surface of the airbag 12 in a plane perpendicular to the first direction D1. As a result, the gas controlled by the diffuser 20 may be uniformly dispersed, thereby controlling the deployment behavior (deployment shape) of the airbag 12 stably and accurately.

In the aspect illustrated in FIG. 12B, two tethers 412U, 412L that restrict movement of the airbag 12 in the first direction D1 are provided. Ends of the tethers 412U, 412L are connected to the occupant-side surface of the airbag 12.

In the example in FIG. 12B, the two tethers 412U, 412L are connected to the front panel of the airbag 12 around the 12 and 6 o'clock positions by sewing.

In the example illustrated in FIG. 12B, the deployment shape of the airbag 12 is not circular when viewed from the occupant, however, a central position X of a virtual circumscribing circle 120 of the tethers 412U, 412L coincides with the central position X of the receiving surface 22 of the diffuser 20. With such configuration, as in FIG. 12A, the gas controlled by the diffuser 20 may be uniformly dispersed, thereby accurately controlling the deployment behavior (deployment shape) of the airbag 12.

Figure 13:
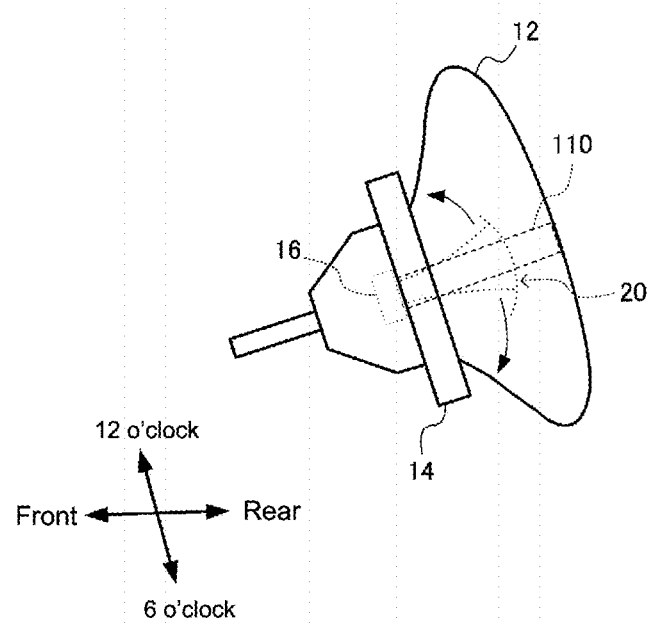
FIG. 13 illustrates a preferred aspect of the airbag device according to the present invention.
Figure 13:
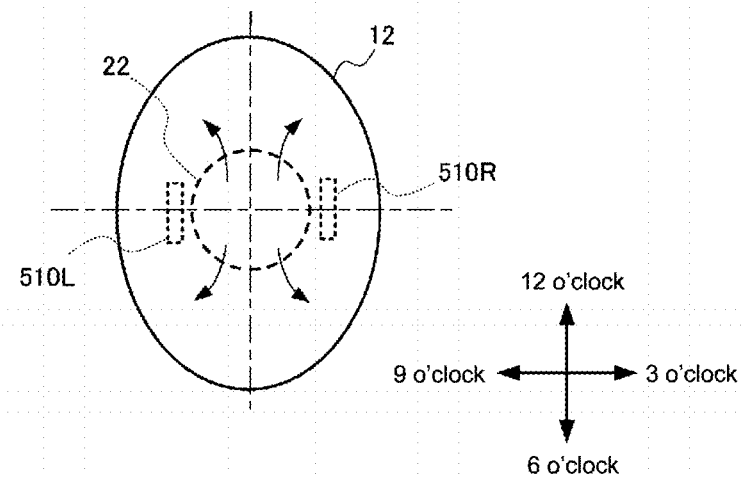

FIG. 13 illustrates a preferred aspect of the airbag device according to the present invention, FIG. 13A is a side view (cross sectional view) illustrating the deployed state of the airbag 12, FIG. 13B is a plan view illustrating positional relationship between connecting portions of tethers 510R, 510L to the airbag 12 and the receiving surface 22 of the diffuser 20.

In the example illustrated in FIGS. 13A and 13B, ends of the tethers 510R, 510L are connected at the 3 o'clock and 9 o'clock positions. Note that the number of tethers is not necessarily limited to two and however, the tether is connected at a position other than the 12 o'clock and 6 o'clock positions. With such a structure, more gas reflected by the receiving surface 22 of the diffuser 20 is quickly guided to the 12 o'clock and 6 o'clock positions, thereby deploying the airbag 12 more quickly in the vertical direction (12 to 6 o'clock directions).

Example 5

Figure 14:
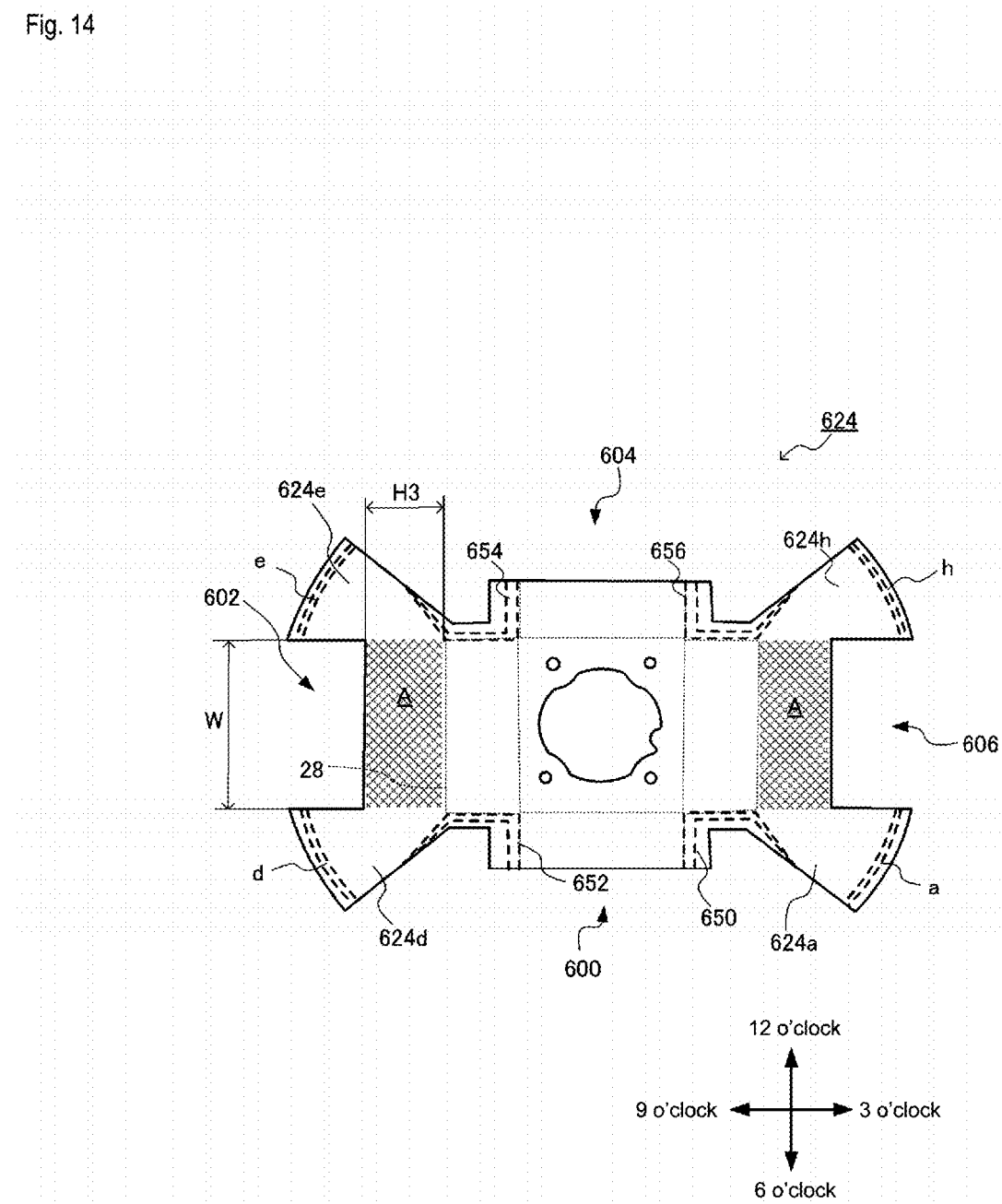
FIG. 14 is a plan view illustrating connecting members (including a base) of a diffuser used in an airbag device according to Example 5 of the present invention.

FIG. 14 is a plan view illustrating connecting members 624 (including the base 28) of a diffuser used in an airbag device according to Example 5 of the present invention. This example is a modification of Example 1 illustrated in FIG. 3B, and the basic structure is the same. Briefly, connecting members 624 according to the present example, the band-like connecting members 24b, 24c, 24f, and 24g illustrated in FIG. 3B are omitted. Redundant descriptions of structures and operations common to Example 1 described above are omitted, and only differences will be described below.

As illustrated in FIG. 14, the connecting members 624 of the diffuser include band-like connecting portions each having a fan-shaped tip 624a, 624d, 624e, and 624h. The connecting portions 624a, 624d, 624e, and 624h are fixedly connected to portions indicated by alphabets a, d, e, and h on the receiving surface (22) by sewing or the like. Furthermore, base sides of these connecting members (624a, 624d, 624e, and 624h) are sewn together along dotted lines 650, 652, 654, and 656 to form the rising wall-like base 28.

In the present example, as compared to Example 1, the openings 600, 604 formed at the 12 o'clock direction and the 6 o'clock position are significantly wider. As a result, more gas flows toward the occupant's head (12 o'clock) and abdomen (6 o'clock) inside the airbag 12, promoting deployment of the airbag 12 in these directions. Note that the opening 100 formed at the 6 o'clock position may be made larger than the opening 104 formed at the 12 o'clock position.

With respect to the opening 606 formed at the 3 o'clock position and the opening 602 formed at the 9 o'clock position, a region A such as a standing wall is formed above the base 28, and the area of the openings 602, 606, that is, the flow rate of the gas to be discharged, may be adjusted by changing a width W and a height H3 of this region A. Such region A may be recognized as an extended region of the base 28.

It goes without saying that the tethers as illustrated in FIGS. 13 and 14 may be employed in this example.

Example 6

Figure 15:
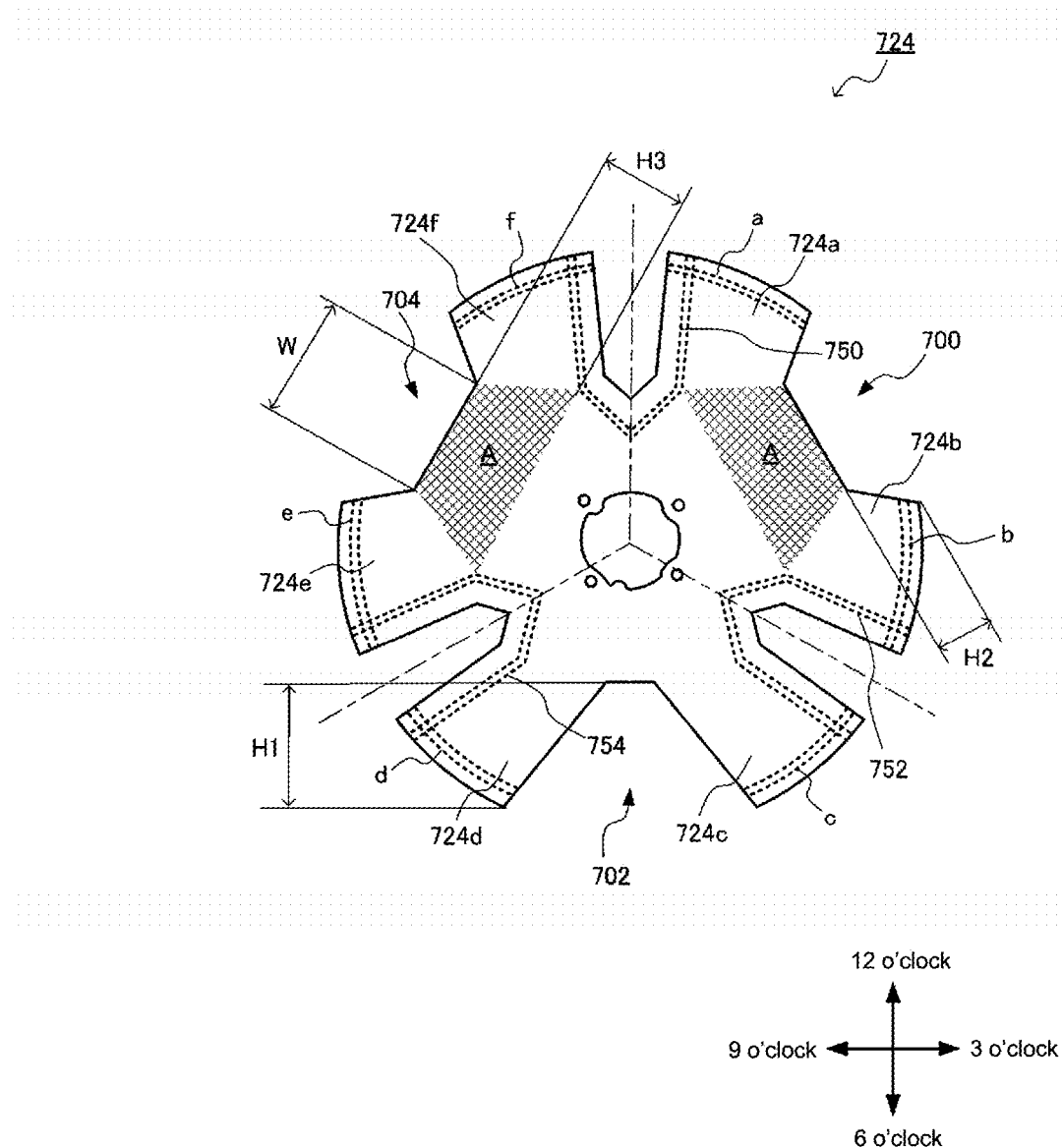
FIG. 15 is a plan view illustrating connecting members (including a base) of a diffuser used in an airbag device according to Example 6 of the present invention.

FIG. 15 is a plan view illustrating connecting members 724 (including the base) of a diffuser used in an airbag device according to Example 6 of the present invention. The present example will be described below, however, redundant descriptions of the structures and operations of the same or corresponding parts to those of the above-described examples will be omitted, and a characteristic structure of the present example will be mainly described.

The characteristic of the present example is that openings 700, 702, and 704 of the diffuser are formed at 2 o'clock, 6 o'clock, and 10 o'clock positions. As illustrated in FIG. 15, the connecting members 724 of the diffuser include band-like connecting portions 724a, 724b, 724c, 724d, 724e, and 724f each having fan-shaped (arcuate) tip. The connecting portions are fixedly connected to portions indicated by alphabets a to f on the receiving surface (22) by sewing or the like.

The connecting portions 724a and 724f, 724b and 724c, and 724d and 724e are sewn together along line 750, 752, and 754 indicated by opposing dotted lines. As a result, the openings 700, 702, and 704 are formed at the 2 o'clock, 6 o'clock, and 10 o'clock positions, respectively. A height (depth) H1 of the opening 702 formed at the 6 o'clock position is larger than a height (depth) H2 of the openings 700, 704 formed at the 2 o'clock and 10 o'clock positions, and an area of the opening 702 (gas flow rate) is set to be same as the sum of areas (gas flow rates) of the openings 700 and 704. As a result, when the airbag device is operated, more gas flows toward the 6 o'clock position of the airbag 12, quickly promoting deployment of the airbag toward the occupant's abdomen.

With respect to the opening 700 formed at the 2 o'clock position and the opening 704 formed at the 10 o'clock position, a region A such as a standing wall is formed below these openings (the inflator) and above the base 28, and the area of the openings 700, 704, that is, the flow rate of the gas to be discharged, may be adjusted by changing a width W and a height H3 of this region A. Such region A may be recognized as an extended region of the base 28.

It goes without saying that the tethers as illustrated in FIGS. 13 and 14 may be employed in this example.

Example 7

Figure 16:
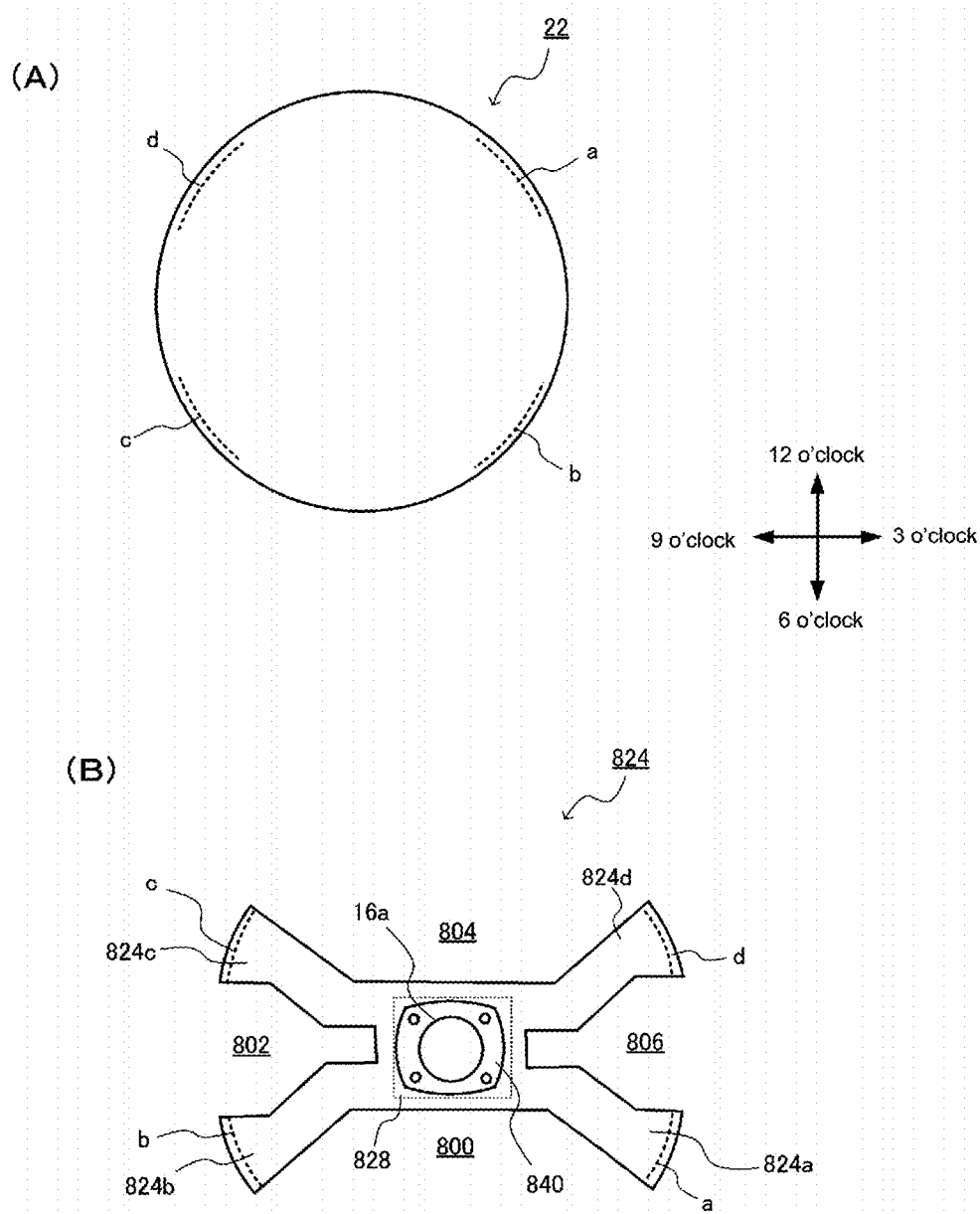
FIG. 16 illustrates the structure of a diffuser used in an airbag device according to Example 7 of the present invention.
Figure 17:
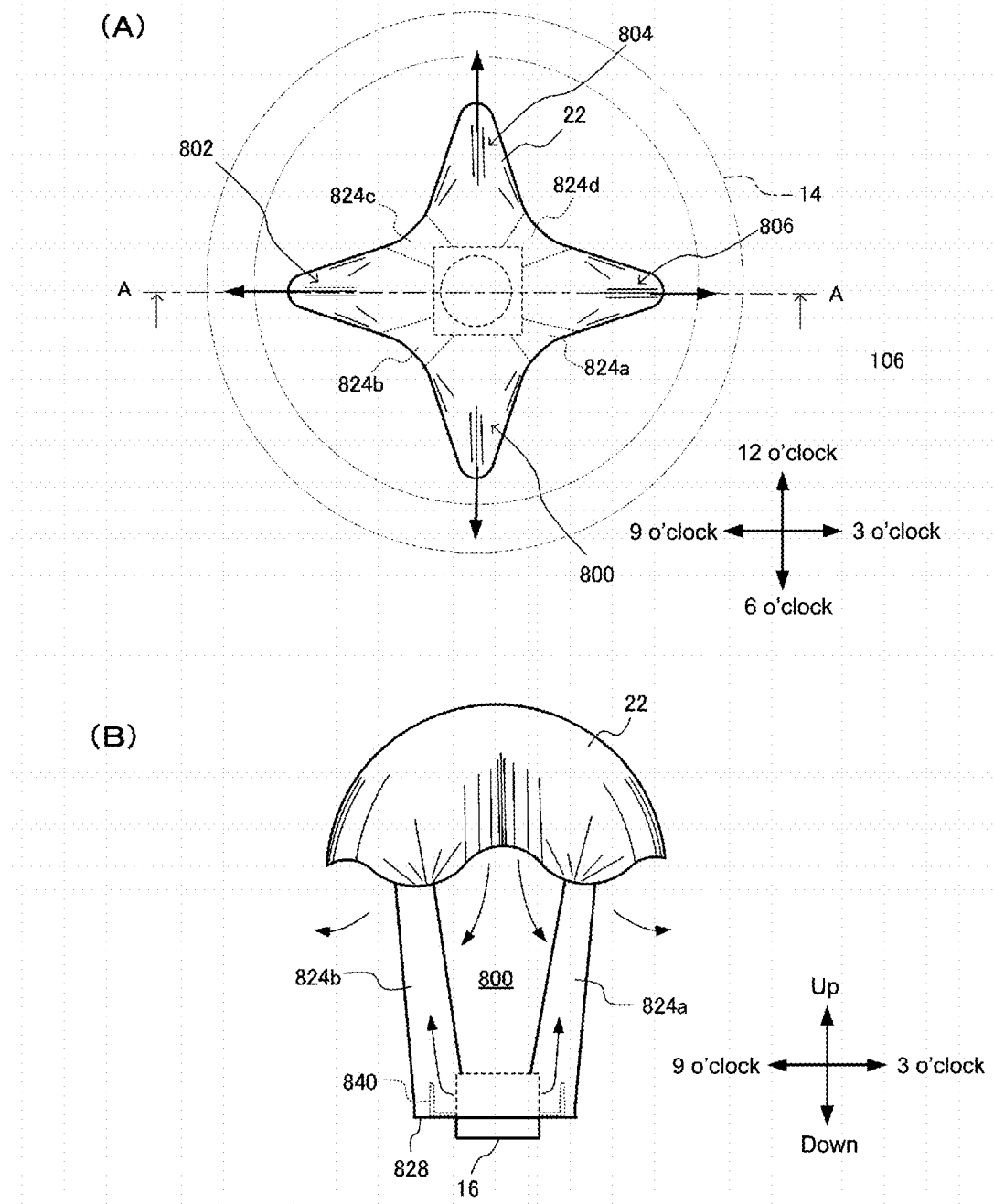
FIG. 17 shows views illustrating the deployed state (operating state) of the diffuser used in an airbag device according to Example 7 of the present invention.
Figure 18:
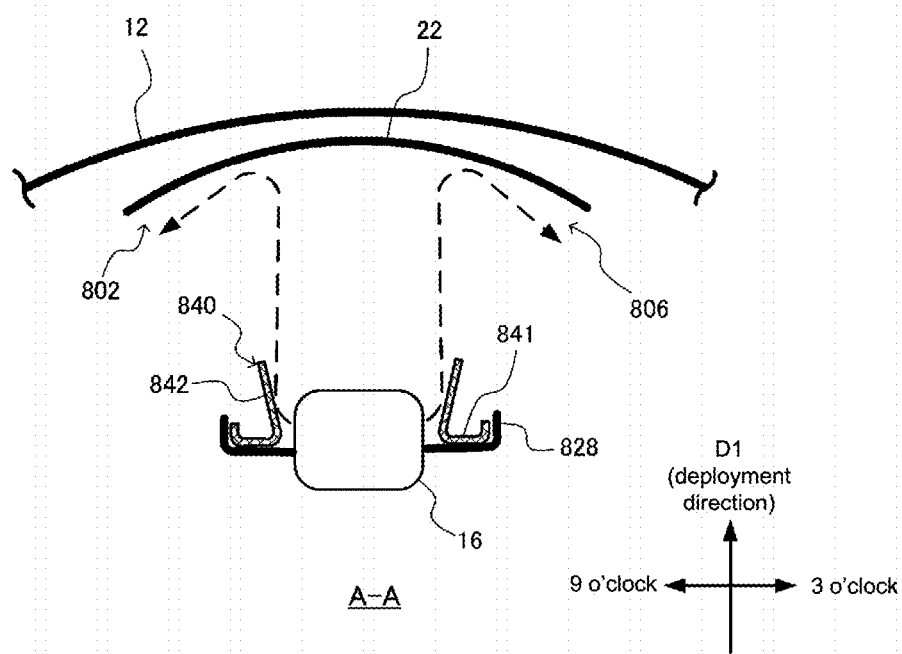
FIG. 18 is a cross sectional view illustrating the structure and function of the diffuser employed in the airbag device according to Example 7 of the present invention, taken along A-A in FIG. 17.
Figure 19:
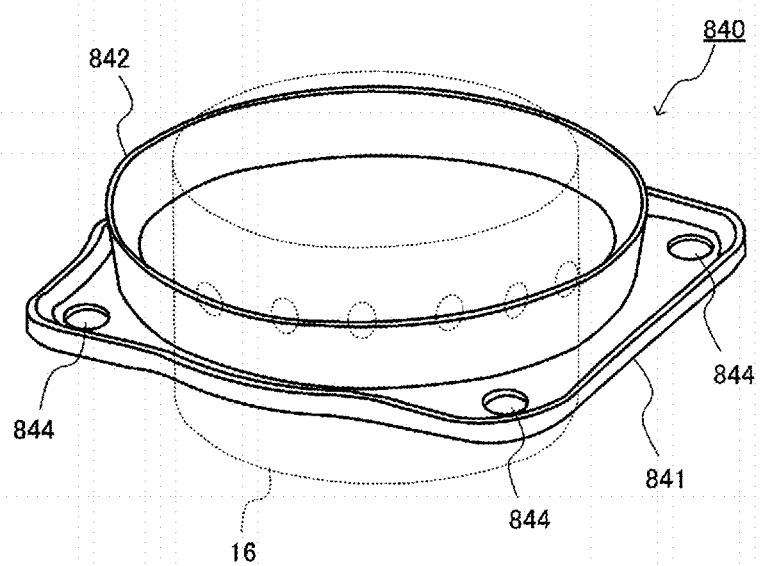
FIG. 19A is a perspective view illustrating the structure of a retainer employed in the airbag device according to Example 7.
FIG. 19B is a plan view (top view) of the retainer.
Figure 19:
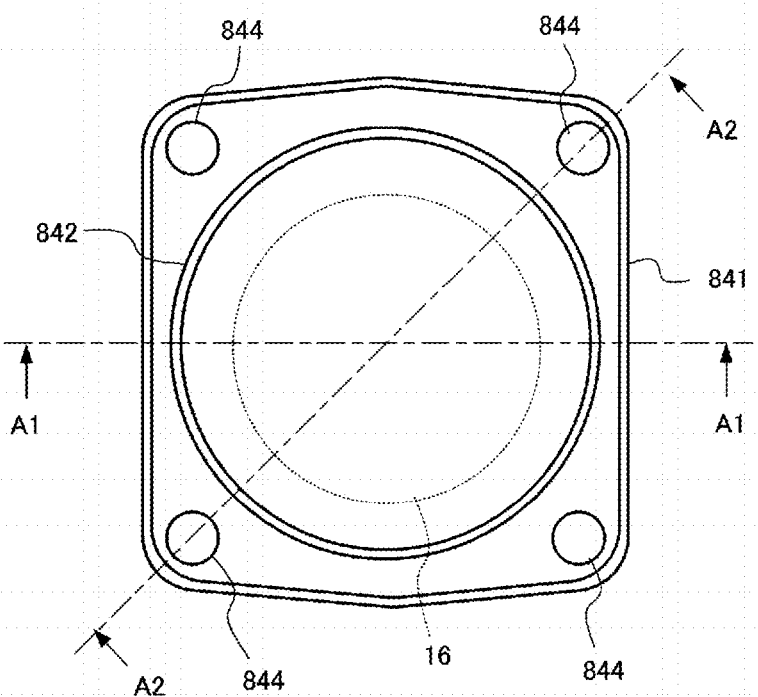
Figure 20:
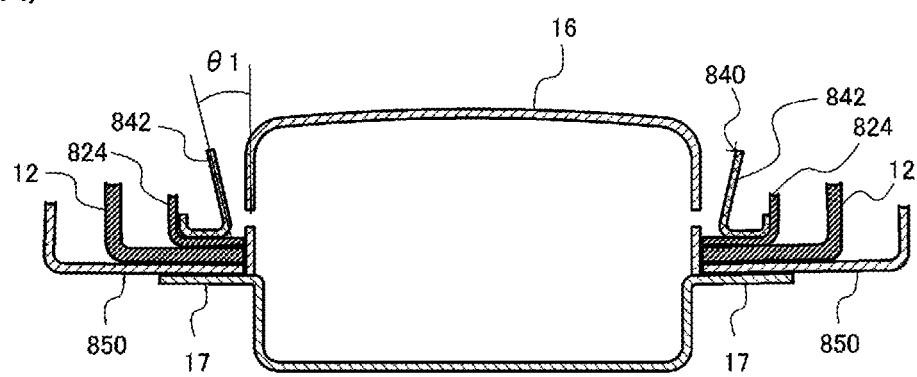
FIG. 20 is a cross-sectional view illustrating the structure around an inflator of the airbag device according to Example 7 of the present invention.
Figure 20:
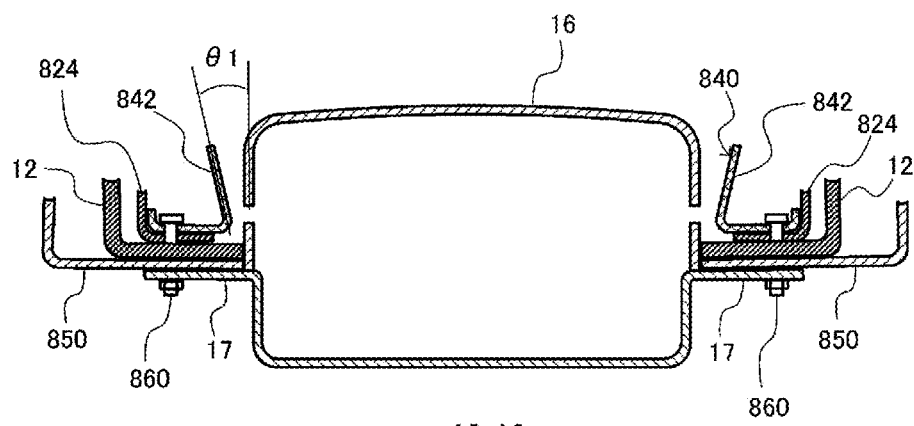

FIG. 16 illustrates the structure of a diffuser used in an airbag device according to Example 7 of the present invention, FIG. 16A is a plan view of a receiving surface 22, and FIG. 16B is a plan view of connecting members 824. FIG. 17 illustrates the deployed state (operating state) of the diffuser, FIG. 17A illustrates the state viewed from directly above, and FIG. 17B illustrates the state viewed from side. FIG. 18 is a cross sectional view illustrating the structure and function of the diffuser according to Example 7 of the present invention, taken along A-A in FIG. 17. FIG. 19A is a perspective view illustrating the structure of a retainer 840 employed according to Example 7, and FIG. 19B is a plan view (top view) of the retainer. FIG. 20 shows cross-sectional views illustrating the structure around an inflator of the airbag device according to Example 7 of the present invention, FIG. 20A illustrates a cross section taken along A1-A1 in FIG. 19, and FIG. 20B illustrates a cross section taken along A2-A2 in FIG. 19.

As illustrated in FIG. 16B, the connecting members 824 of the diffuser include band-like or partially-fan-shaped connecting portions 824a, 824b, 824c, and 824d. The connecting portions 824a to 824d are connected and fixed to portions indicated by alphabets a to d on the receiving surface 22, respectively, by sewing or the like.

As can be seen from the connected (sewn) locations a to h in FIG. 16A, sewing lengths a, b, c, and d of the connecting portions 824a to 824d and the receiving surface 22 each are shorter than a length of the unsewn portion, thereby ensuring wide openings (800, 802, 804, and 806) through which gas flows. In particular, the opening (unsewn length) 804 located at the 12 o'clock position and the opening (unsewn length) 800 located at the 6 o'clock position are larger than the openings (unsewn length) 806, 802 located at the 3 o'clock and 9 o'clock positions.

In the present example, within the airbag 12, more gas flows toward the driver's head (12 o'clock) and the driver's abdomen (6 o'clock), promoting deployment of the airbag 12 in these directions. Also, the opening 800 formed at the 6-o'clock position may be made larger than the opening 804 formed at the 12 o'clock position, in which case the airbag 12 may be deployed from the occupant's chest to the occupant's abdomen more quickly.

A retainer 840 having a hole 16a into which the inflator 16 is inserted is formed at the center of the connecting members 824. As illustrated in FIG. 19, the inflator 16 is cylindrical, and a plurality of gas discharge ports are formed on its side surface, such that gas is radially discharged from the center.

The retainer 840 includes a substantially rectangular base portion 841 and a substantially cylindrical ring portion 842 provided at the center of the base portion 841. Bolt holes 844 through which respective stud bolts 860 (see FIG. 20) pass are formed at four corners of the base portion 841. The ring portion 842 is shaped like a wall rising from the base portion 841 in the vicinity of the gas discharge opening of the inflator 16, and is configured to reflect the gas discharged from the inflator 16 and guide the gas upward (in the D1 direction and toward the receiving surface 22). In other words, the ring portion 842 functions similarly to the base 28 of the diffuser according to Example 1. Thus, in the present example, the base of the diffuser is substantially unnecessary.

As illustrated in FIG. 20, the ring portion 842 of the retainer 840 is inclined outward at an angle of θ1 relative to the sidewall of the inflator 16. The angle θ1 and height of the ring portion 842 is preferably set as appropriate according to the positional relationship with the receiving surface 22 and the dimensions thereof, and θ1 may be set to approximately 0 to 15 degrees, for example. Note that in FIG. 20, reference numeral 17 denotes a flange of the inflator 16, and reference numeral 850 denotes a housing of the airbag device.

In this example, when the airbag device 10 is operated, the gas discharged from the inflator 16 impinges on the receiving surface 22 of the diffuser 20 prior to filling the entire airbag 12. At this time, as illustrated in FIG. 17, the receiving surface 22 of the diffuser 20 curves like a parachute, and the connecting portions 824a to 824d form concave and convex portions radially extending to the receiving surface 22. The portions of the receiving surface 22, where the connecting portions 824a to 824h are not sewn, form obliquely downward openings (800, 802, 804, and 806) like a bird's bill. Then, the gas reflected at the receiving surface 22 flows into the inside of the airbag 12 along the channel-like openings (800, 802, 804, and 806) extending radially from the center.

This allows the airbag 12 to deploy quickly in the planar direction (the direction perpendicular to the first direction D1) at the initial stage of deployment, enabling the airbag 12 to quickly in front of the occupant's chest and abdomen and to restrict the occupant with a wide area, even when the occupant is seated close to the steering wheel 14. In addition, since the pressure directed directly to the occupant side by the expanded airbag 12 is temporarily received by the receiving surface 22 of the diffuser 20, damage to the occupant may be minimized.

While examples of the present invention have been described thus far, the present invention is in no way limited by these examples and may be changed as long as they are included in the category of technical ideas indicated in the Scope of the Patent Claims. In the examples described above, the driver airbag device housed in the steering wheel has been described, however, the present invention can be applied to an airbag device that deploys in front of the occupant to be protected, such as the passenger-side airbag device housed in an instrument panel.

The invention claimed is:

1. An airbag device comprising:
   a gas generator configured to generate expansion gas;
   an airbag configured to expand and deploy due to the expansion gas to restrain an occupant; and
   a diffuser disposed inside the airbag to control a flow of the expansion gas; wherein:
   given that a direction toward the occupant is a first direction, the diffuser includes a receiving surface disposed between the gas generator and the airbag in the first direction to receive the expansion gas discharged from the gas generator; and a plurality of connecting members having one end connected to an edge of the receiving surface and the other end directly or indirectly connected to the gas generator, and
   the connecting members each further include a base configured to be erected in the first direction in a deployed state above the gas generator and surrounding a periphery of the gas generator.

2. The airbag device according to claim 1, wherein:
   the connecting members restrict movement of the receiving surface in the first direction, and
   the expansion gas against the receiving surface is guided from an opening formed between the adjacent connecting members into the airbag.

3. The airbag device according to claim 2, wherein a width of the opening is greater than a width of the connecting member.

4. The airbag device according to claim 1, wherein:
   when the airbag is viewed from the occupant, given that 12 o'clock and 6 o'clock positions in a plane perpendicular to the first direction are positions directly above and directly below the occupant,
   the openings are formed at 12 o'clock, 3 o'clock, 6 o'clock, and 9 o'clock positions, and
   an area of the openings formed at the 12 o'clock and 6 o'clock positions is larger than an area of the openings formed at the 3 o'clock and 9 o'clock positions.

5. The airbag device according to claim 1, wherein the receiving surface is circular.

6. The airbag device according to claim 1, wherein, at deployment of the airbag, the receiving surface of the diffuser curves like a parachute, and the connecting members form concave and convex portions radially extending to the receiving surface.

7. The airbag device according to claim 1, wherein
   the base is configured to guide the expansion gas in the first direction, and
   the other ends of the connecting members are connected to the base.

8. The airbag device according to claim 7, wherein the base and the connecting member are integrally molded.

9. The airbag device according to claim 1, further comprising a housing configured to house the airbag and a retainer configured to hold the gas generator relative to the housing, wherein the retainer includes a wall portion configured to surround the gas generator and guide the expansion gas in the first direction.

10. The airbag device according to claim 9, wherein the other ends of the connecting members are connected to the retainer.

11. The airbag device of claim 1, wherein a central position of the receiving surface substantially coincides with a central position of the airbag in the plane perpendicular to the first direction.

12. The airbag device according to claim 1, further comprising a tether configured to restrict movement of the airbag in the first direction, wherein one end of the tether is connected to an occupant-side plane of the airbag.

13. The airbag device of claim 12, wherein:
the two or more tethers are provided, and
the two or more tethers are connected to the airbag at a location that does not substantially inhibit a gas flow through the opening.

14. The airbag device of claim 13, wherein a central position of the receiving surface substantially coincides with a central position of a virtual circumscribing circle of the two or more tethers in the plane perpendicular to the first direction.

15. The airbag device according to claim 1, wherein the airbag device is configured to be housed in a steering wheel of an automobile.

16. An airbag device comprising:
a gas generator configured to generate expansion gas;
an airbag configured to expand and deploy due to the expansion gas to restrain an occupant; and
a diffuser disposed inside the airbag to control a flow of the expansion gas; wherein:
given that a direction toward the occupant is a first direction, the diffuser includes: a receiving surface disposed between the gas generator and the airbag in the first direction to receive the expansion gas discharged from the gas generator; and
a plurality of connecting members having one end connected to an edge of the receiving surface and the other end directly or indirectly connected to the gas generator, and
the plurality of connecting members further includes a base configured to be erected in the first direction in a deployed state above the gas generator and surround a periphery of the gas generator,
the plurality of connecting members restrict movement of the receiving surface in the first direction,
the expansion gas against the receiving surface is guided from an opening formed between the adjacent connecting members into the airbag,
a width of the opening is larger than a width of the connecting member,
when the airbag is viewed from the occupant, given that a 12 o'clock position and a 6 o'clock position in a plane perpendicular to the first direction are a position directly above the occupant and a position directly below the occupant, respectively,
the openings are formed at 12 o'clock, 3 o'clock, 6 o'clock, and 9 o'clock positions, and
an area of the openings formed at the 12 o'clock and 6 o'clock positions is larger than an area of the openings formed at the 3 o'clock and 9 o'clock positions.

17. An airbag device comprising:
a gas generator configured to generate expansion gas;
an airbag configured to expand and deploy due to the expansion gas to restrain an occupant; and
a diffuser disposed inside the airbag to control a flow of the expansion gas; wherein:
given that a direction toward the occupant is a first direction, the diffuser includes: a receiving surface disposed between the gas generator and the airbag in the first direction to receive the expansion gas discharged from the gas generator; and a plurality of connecting members having one end connected to an edge of the receiving surface and the other end directly or indirectly connected to the gas generator, and
the connecting members each further include a base configured to be erected in the first direction in a deployed state above the gas generator and surround a periphery of the gas generator,
when the airbag is viewed from the occupant, given that a 12 o'clock position and a 6 o'clock position in a plane perpendicular to the first direction are a position directly above the occupant and a position directly below the occupant, respectively,
the openings are formed at 12 o'clock, 3 o'clock, 6 o'clock, and 9 o'clock positions,
an area of the openings formed at the 12 o'clock and 6 o'clock positions is larger than an area of the openings formed at the 3 o'clock and 9 o'clock positions, and
at deployment of the airbag, the receiving surface of the diffuser curves like a parachute, and the connecting members form concave and convex portions radially extending to the receiving surface.

* * * * *